(12) United States Patent  (10) Patent No.: US 7,088,659 B2
Hibino  (45) Date of Patent:  Aug. 8, 2006

(54) OPTICAL DISK APPARATUS AND TILT DETECTION METHOD

(75) Inventor: Kiyoshi Hibino, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 369 days.

(21) Appl. No.: 10/265,322

(22) Filed: Oct. 7, 2002

(65) Prior Publication Data

US 2003/0081520 A1   May 1, 2003

(30) Foreign Application Priority Data

Oct. 25, 2001  (JP) .............................. 2001-327440

(51) Int. Cl.
  *G11B 7/00*  (2006.01)
  *G11B 7/135*  (2006.01)
(52) U.S. Cl. ................ 369/53.19; 369/118; 369/44.32; 369/44.24; 369/112.28
(58) Field of Classification Search ............ 369/53.19, 369/44.32, 44.24, 118, 112.28, 112.21, 112.29
See application file for complete search history.

(56) References Cited

U.S. PATENT DOCUMENTS

| | | | |
|---|---|---|---|
| 4,775,965 A * | 10/1988 | Yoshimoto et al. ...... | 369/44.26 |
| 5,322,993 A * | 6/1994 | Ohyama ..................... | 369/118 |
| 5,657,303 A * | 8/1997 | Namoto et al. .......... | 369/44.32 |
| 5,896,362 A * | 4/1999 | Okuda et al. ............ | 369/53.19 |
| 6,525,332 B1 * | 2/2003 | Chang et al. .......... | 250/559.37 |
| 6,744,716 B1 * | 6/2004 | Takemoto ................ | 369/53.19 |
| 2002/0048248 A1 * | 4/2002 | Nakao .................... | 369/112.12 |

FOREIGN PATENT DOCUMENTS

| | | | |
|---|---|---|---|
| JP | 58158044 A | * | 9/1983 |
| JP | 63-066735 | | 3/1988 |
| JP | 09-251647 | | 9/1997 |
| JP | 2000-020992 | | 1/2000 |
| JP | 2000-057608 | | 2/2000 |
| JP | 2000-113489 | | 4/2000 |

* cited by examiner

*Primary Examiner*—Brian E. Miller
*Assistant Examiner*—Peter Vincent Agustin
(74) *Attorney, Agent, or Firm*—Arent Fox PLLC

(57) ABSTRACT

An optical disk apparatus includes a laser diode, and a light from the laser diode becomes a parallel light by a collimator lens, which is reflected toward an object lens by a reflection mirror. The parallel light transmitted through a through-hole provided on an object lens holder is reflected by a disk, and a reflected light is incident upon a light-receiving sensor via the collimator lens, a polarizing beam splitter and a prism. The parallel light reflected by the reflection mirror is reflected by a mirror integrated with the object lens holder, and incident upon the light-receiving sensor via the collimator lens, the polarizing beam splitter and the prism. A disk tilt and/or an object lens tilt are/is detected from output signals of divided light-receiving sensors of the light-receiving sensor.

11 Claims, 24 Drawing Sheets

OPTICAL DISK APPARATUS AND TILT DETECTION METHOD

BACKGROUND OF THE INVENTION

1. Field of the Invention

The present invention relates to an optical disk apparatus and a tilt detection method. More specifically, the present invention relates to an optical disk apparatus and a tilt detection method which detects a tilt of an optical disk such as a DVD, a CD or the like so as to mitigate an influence of the disk tilt.

2. Description of the Prior Art

With an increased recording capacity of an optical disk and its enhanced recording density, a beam spot which irradiates to the optical disk to reproduce or record a signal is becoming minute. More specifically, in an optical disk apparatus which performs a recording, a minute beam spot is required than a reproduction-use optical disk apparatus in order to record a signal in a good condition. To obtain the minute spot, an object lens with large numerical aperture is adopted, and consequently, a side effect occurs, in which a deteriorated level of a spot quality by the disk tilt becomes evident.

The deteriorated level of a spot quality by the disk tilt mainly means a generation of a comatic aberration, that is, as a result of a blurred imagery, a spot size becomes large, and its central optical intensity deteriorates in addition thereto. If the spot size becomes large, a minute signal is not read out appropriately. In a case of the optical disk on a principal that a recording is performed by an optical heat, a decrease in the central optical intensity results in its temperature not reaching a predetermined value required for the recording, thus not possible to record. On the other hand, if an entire amount of light is increased in order to obtain the predetermined temperature, an area above the predetermined temperature expands, thus not possible to record minutely.

The disk tilt is a state produced in a case of using a disk with a large curvature. A state that a portion to which a beam irradiates is radially tilted toward the disk is referred to as a radial tilt, and a state tangentially tilted is referred to as a tangential tilt.

Referring to FIG. 1 and FIG. 2, a method of a prior art 1 in which such the disk tilt is detected and corrected is described. In FIG. 1, a disk 1, that is, a recording and reproducing body is held by a holding portion 2, rotated by a spindle motor 3a, and receives a light irradiation from an optical pick-up 4, thereby recording a signal on the disk 1 or reproducing a signal from the disk 1. The optical pick-up 4 is held by a shaft 5a, and the shaft 5a is held by a shaft holder 5b. The shaft holder 5b is fixed on a shaft holder chassis 5c. It is noted that the above-described spindle motor 3a is fixed on a spindle motor chassis 3b, and the spindle motor chassis 3b and the shaft holder chassis 5c are joined by a holding shaft 6. In addition, a cam 7 which oscillates an edge of the shaft chassis 5c up and down is provided on the spindle motor chassis 3b.

It is noted that as shown in FIG. 2, a tilt sensor 8 which detects the tilt of the disk 1 is provided inside the optical pick-up 4. The tilt sensor 8 is an electronic part in which a light emitted from an internal LED is reflected on a reflection surface horizontal to a sensor-providing surface, and taking an electronic signal output in accordance with a position at which the reflected light falls on an internal light-receiving sensor as a reference, it is detected that the position at which the reflected light falls on the internal light-receiving sensor is deviated by a change of the output signal when the reflection surface is tilted, and consequently, the tilt on the reflection surface is detected.

The light emitted from the optical pick-up 4 is focused on the disk 1 rotated by the spindle motor 3a so as to form a minute spot. The optical pick-up 4 moves along the shaft 5a by a driving portion (not shown). Therefore, the spot is capable of scanning in a two-dimensional manner on the disk 1. This allows the optical pick-up 4 to record a signal on a signal surface provided at a depth of an inner side via a transparent cover glass layer from a surface of the disk 1, and reproduce the signal from a signal surface.

Next, descriptions are made with respect to an operation in a state that a shape of the disk 1 has a predetermined gradient toward a radial direction or in a state that the gradient is gradually changing along with a radius, and in a case that such the disk 1 is attached to an apparatus.

The tilt sensor 8 detects a radial tilt amount. The cam 7 is rotated by a driving source not shown, and oscillates the edge of the shaft holder chassis 5c up and down. As the result, the optical pick-up 4 attached on the chassis 5c, using the shaft 6 as its center, changes the gradient. It is possible to stop the cam7 by detecting a relative angle with the disk 1 by the tilt sensor 8 while changing the gradient of the optical pick-up 4 in such a state that the optical pick-up 4 and the disk 1 maintain a parallel relationship with each other. This solves the comatic aberration from the spot on the disk 1. That is, in the prior art 1, the gradient of the optical disk 4 is changed in accordance with the disk tilt amount detected by the tilt sensor 8 so as to compensate or cancel the disk tilt.

Unlike the prior art 1, there is a method that compensates or cancels the comatic aberration produced by the disk tilt by means of the comatic aberration produced by slanting the object lens. In the prior art 2, a tilt amount of the object lens capable of compensating the comatic aberration produced by the disk tilt is examined in advance, and the tilt amount of the object lens is controlled in accordance with the detected disk tilt amount.

There is a method that does not detect the tilt amount. In a prior art 3, provided is a means in which the entire optical pick-up is slanted or the object lens is slanted so that an amplitude of a waveform that the signal is reproduced, that is, a so-called RF amplitude is rendered maximum or a "jitter" showing a fluctuation of the signal with respect to time is rendered minimum.

Also is there a method which uses a signal correlated with the disk tilt out of detected signals of a reflected light in pits or emboss structure formed in advance on the disk using not only a main beam which reads the signal but also sub-beams used for a tracking. In a prior art 4, a tilt servo is performed by, while such the signal is detected, adjusting a gradient of the entire optical disk and the gradient of the object lens.

In the prior art 1, its structure becomes too complicated. In addition, it is difficult to respond to a radial tilt which changes in a time that the disk makes one rotation. In a case that a curvature of the disk varies in a period of one rotation of the disk 1, a 1-time speed DVD requires a dynamic response in a period of 45 milliseconds, and a response in a cycle of 6 milliseconds is necessary in order to respond to an 8-time speed DVD, for example. A high speed responsiveness is thus necessary for a movement in slanting the optical pick-up, and such the high speed response is difficult in the structure of the prior art 1.

The prior art 2 method is suitable for a miniaturization compared to a method which slants the entire pick-up or the disk, and in addition, its responsiveness is high. However, in realizing it, since both the disk tilt and the object lens tilt are to be detected from a common independent reference surface, thus requiring two tilt sensors. Therefore, it is difficult to miniaturize using the tilt sensor as in the prior art 1.

Furthermore, in the prior art 2, it is appropriate to detect the disk tilt only, and tilt the object lens in accordance with the detected tilt amount. However, in this case, a physical amount correlated with the tilt amount of the object lens is operated. In a case of a structure that an actuator which holds the object lens is operated by an electromagnetic force, a disequilibrium of a magnetic field is generated by manipulating a current flowing through a coil so as to slant the actuator, for example. A value of the electric current in this case is the "physical amount". However, since this method uses an open control not a feed back control, whether or not the actuator is actually slanted by a desired degree is not clear, and in addition, a correlation relationship between the manipulated physical amount and the gradient varies on each pick-up, thus not guaranteed to be controlled in a most appropriate state.

Application of the prior art 3 is difficult to adapt in recording.

Moreover, since the method of the prior art 4 depends upon a physical format, that is, a shape of the disk, it is not possible to apply the tilt servo to all disks subject to the drive device in a compound disk drive device which performs a recording in a disk of various physical formats by a single device.

SUMMARY OF THE INVENTION

Therefore, it is a primary object of the present invention to provide a novel optical disk apparatus and a tilt detection method.

It is another object of the present invention to provide an optical disk apparatus, a tilt detection method, and an apparatus thereof capable of being applied in recording, detecting both a radial tilt and a tangential tilt, being applied to a disk in a physical format of a comprehensive disk, and being realized in a small device not using an additional extra light source and not requiring to increase a laser output of a pick-up light source.

A first invention is a tilt detection method that a disk tilt and/or an object lens tilt are/is detected in an optical disk apparatus in which a parallel light from a collimator lens is irradiated onto an optical disk through an object lens, characterized in that a detection is made using a light eclipsed by an object lens pupil out of the parallel light.

A second invention is an optical disk apparatus comprising: a collimator lens which converts a light from a light source into a parallel light; an object lens which focuses the parallel light from the collimator lens onto an optical disk; an object lens holder which holds the object lens; a light transmitting portion which is formed on the object lens holder at a first position distant toward a track tangential direction of the optical disk from the object lens, a transmitted parallel light transmitted through the portion being irradiated onto the optical disk; a first condensing lens which receives the transmitted parallel light reflected from the optical disk; and a disk tilt sensor which receives an incident light from the first condensing lens and has a plurality of first light-receiving sensors.

In this case, the first condensing lens may be the collimator lens, and in addition, a first prism may also be provided at a position distant from an optical axis between the collimator lens and the disk tilt sensor, and the disk tilt sensor may receive the incident light from the first prism.

An optical disk further comprises a reflection portion which moves in an integrated manner with the object lens and reflects the parallel light at a second position opposite to the first position in a track tangential direction of the optical disk so as to output a reflected light; a second condensing lens which receives the reflected parallel light; and a lens tilt sensor which receives an incident light from the second condensing lens and has a plurality of second light-receiving sensors.

The reflection portion includes a reflection plate, and the reflection plate includes a mirror integrated with the object lens or a flat flange of the object lens.

In addition, the second condensing lens may be the collimator lens, and in this case, a second prism is provided at a location distant from an optical axis between the collimator lens and the lens tilt sensor, and the lens tilt sensor receives the incident light from the second prism.

The first prism and the second prism are provided at distant positions which are opposite with each other from the optical axis, and change a direction of light to a mutually opposite direction toward the optical axis.

In order to detect a position of the beam which falls on the first light-receiving sensor or the second light-receiving sensor, it may be appropriate to perform an operation of an output difference of a pair of sensors aligned toward a moving direction of a beam, or an output difference of a pair of sensor clusters, or a ratio which is obtained by dividing an output difference of a pair of sensors aligned toward a moving direction of a beam by an output sum of the pair of sensors, or a ratio which is obtained by dividing an output difference of a pair of sensor clusters by an output sum of the pair of sensor clusters.

A tilt servo means tilts the object lens by a predetermined amount using the object lens tilt sensor in accordance with the disk tilt amount detected using the disk tilt sensor.

The parallel light at a distant position toward a tangential direction from the object lens, that is, the track tangential direction of the disk, or the parallel light transmitted through the light transmitting portion, for example, is irradiated onto a disk surface, and incident upon a plurality of the first light-receiving sensors of the disk tilt sensor, for example, after being condensed by the collimator lens or the condensing lens for the light-receiving sensor.

When the disk is tilted, since the parallel light reflected by the disk changes its direction in accordance with a disk gradient, a direction of the parallel light irradiation to the collimator lens or the condensing lens for the light-receiving sensor is incident is slanted. Consequently, an image height collected on the first light-receiving sensor for the disk tilt detection changes.

An electrical signal each having a current or voltage according to an incident light amount is output from each of the first light-receiving sensors. A position of the reflected light which falls on the first light-receiving sensor for the disk tilt detection moves from a position of a state that the disk tilt is not present. Thus, an output balance from the respective sensors also change in accordance with the position. A detection of the output balance uses an output difference of a pair of sensors aligned toward a moving direction of the beam. The output balance of the outputs of the respective divided sensors in a case of absence of the disk tilt is used as a reference value.

The parallel light, which is reflected by a minute reflection plate which moves to be integrated with the object lens provided in a vicinity of the object lens or a portion of a flat flange of the object lens, and is distant toward the tangential direction from the object lens and toward the opposite direction to a position of the parallel light used for the disk tilt, heads for the lens tilt sensor after being collected by the collimator lens or the condensing lens for the light-receiving sensor, and is incident upon the second light-receiving sensor which is divided in two or four.

When the object lens is tilted, the parallel light which is reflected by the reflection portion of the minute reflection plate or the like which slants along with the object lens changes its direction in accordance with a gradient of the object lens, and consequently, a direction which irradiates on the collimator lens or the condensing lens for the light-receiving sensor changes. As a result, an image height condensed onto the object lens tilt sensor changes. From each of the respective second light-receiving sensors, an electrical signal of a current or voltage is output according to an irradiated amount of light. Due to the object lens tilt, a position of the beam which falls on the object lens tilt sensor moves from a beam position of a state that the object lens tilt is not present, and the output balance from the respective sensors changes in accordance with the position. With respect to a detection of the output balance, an output difference of a pair of the sensors aligned on the moving direction of the beam or a ratio obtained by dividing the difference by the sum thereof is used. An output balance of the respective sensors of the divided sensors in a state that no object lens tilt occurs is rendered a reference value.

In order to compensate or cancel the comatic aberration generated by the disk tilt, the object lens is tilted by the tilt servo means until a state that the object lens is almost rendered parallel to the disk in a parallel direction toward the disk. The disk tilt amount and the tilt amount of the object lens which dissipates the comatic aberration generated thereby are examined in advance, and the lens is caused to be tilted in accordance with the above relationship after the disk tilt amount is detected. In a case of recording or reproducing by a single optical pick-up, a plurality of kinds of disks which differ in thickness and refractive index, the disk tilt amount and the tilt amount of the object lens which dissipates the comatic aberration generated thereby are examined each kind by each kind, and the tilt servo may be respectively applied in accordance therewith.

In a case of recording or reproducing a plurality of kinds of respective disks by one optical pick-up using respective exclusive lasers, since the output balance of the respective divided sensors when attached a disk with no tilt is not the same as the case using each of the exclusive lasers, different reference values are provided.

According to the present invention, since it is applicable in recording, it is possible to perform a high-quality recording. In addition, since it is applied to both the radial tilt and the tangential tilt, it is possible to sufficiently resolve a deterioration of the spot due to the disk tilt.

Furthermore, since it is applicable to a wide variety of a physical format of the disks, it is possible to be applied to various optical pick-ups.

Moreover, since an additional extra light source is not used, it is possible to prevent a cost from rising, and in addition, since it is not necessary to increase a laser output of the light source of the pick-up for the tilt detection, it is possible to avert a problem such as an adverse effect due to overheat, a deterioration of a laser, and so on.

In addition, since the entire pick-up is not maximized, it is possible to perform the tilt servo by a small pick-up for a recording-type disk drive apparatus mounted in a note book computer.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
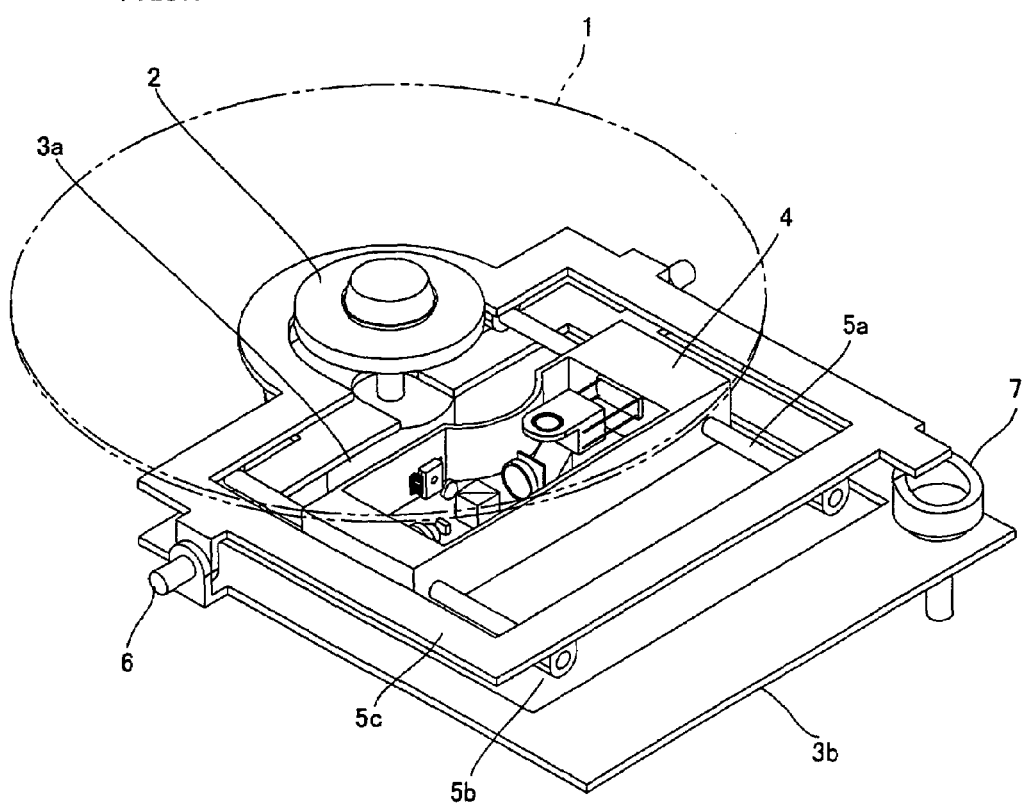
FIG. 1 is an illustrative view showing a conventional optical disk apparatus except for a control circuit portion.
Figure 2:
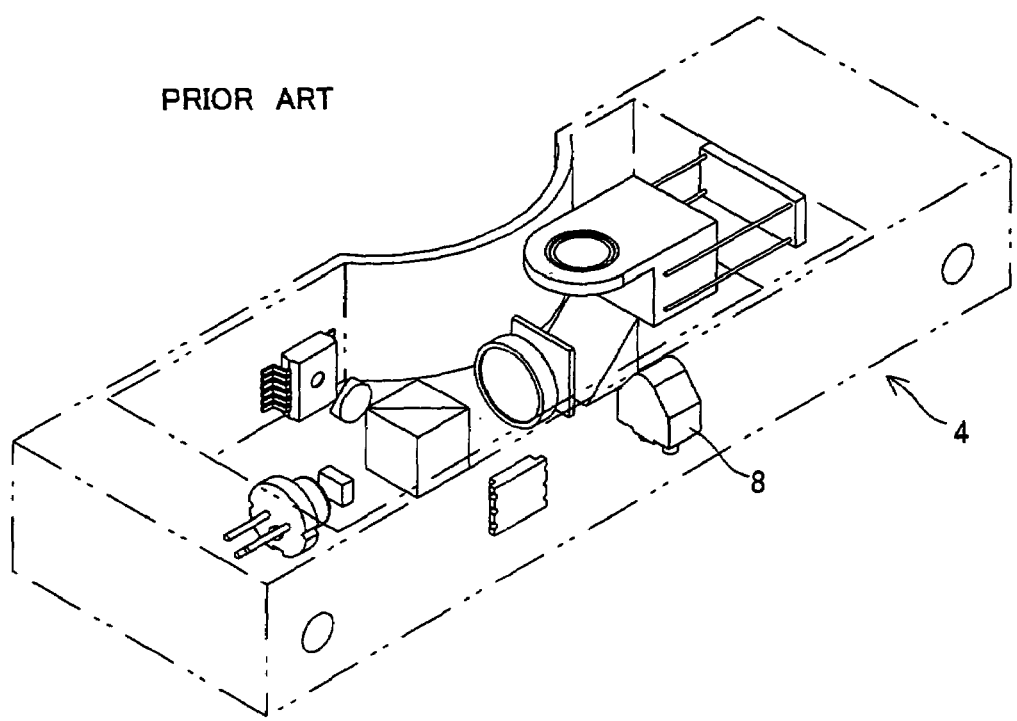
FIG. 2 is an illustrative view showing structure of an optical pick-up of the FIG. 1 conventional apparatus.
Figure 3:
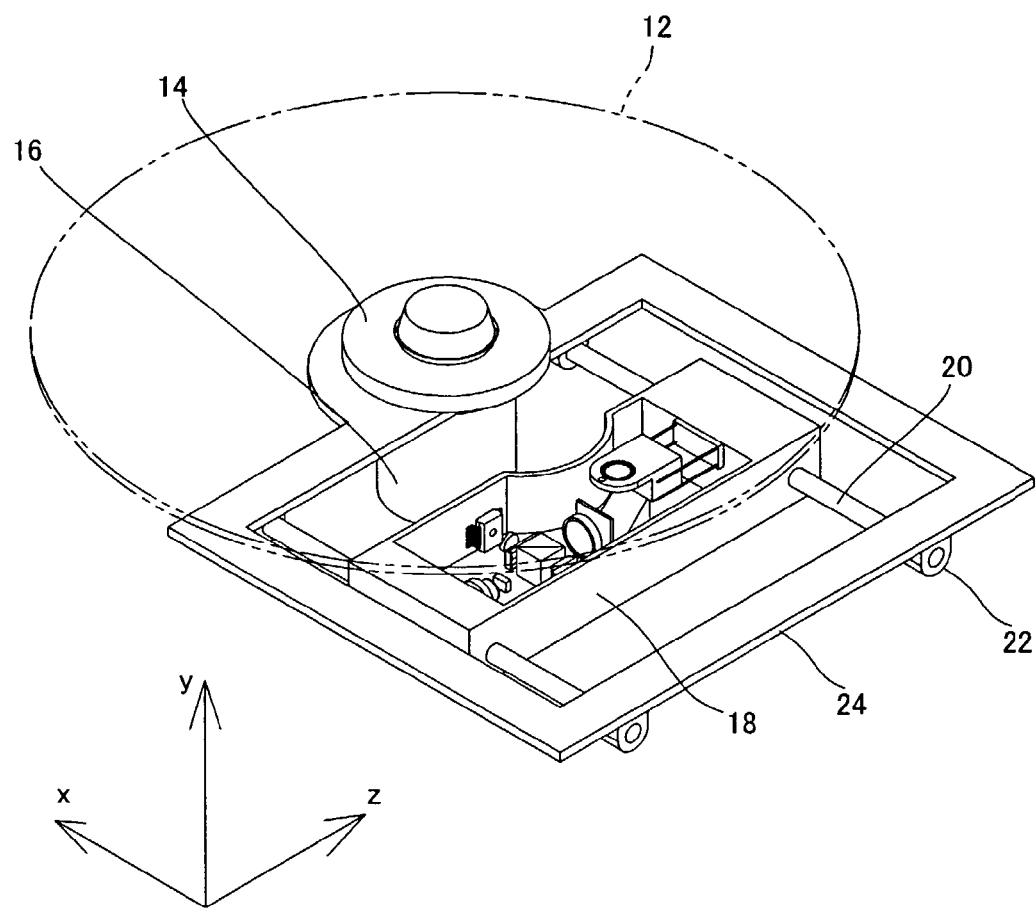
FIG. 3 is an illustrative view showing one embodiment of the present invention except for a control circuit portion.

Referring to FIG. 3, an optical disk apparatus which is one embodiment of the present invention uses a disk 12 such as a DVD-R/RW or the like, for example as a means to record or reproduce a signal. It is noted that in order that lower structural parts of the disk 12 are clearly specified, only an outer form of the disk 12 is illustrated by an imaginary line in FIG. 3. The disk 12 is held by a holding portion 14, and rotated by a spindle motor 16. Below the disk 12, provided is an optical pick-up 18 for recording a signal to the disk 12 and reproducing a signal from the disk 12, and the optical pick-up 18 is held by a shaft 20 in such a manner as to be movable toward an axial direction of the shaft 20. In addition, the shaft 20 is held by a shaft holder 22, and the shaft holder 22 is fixed on a chassis 24, together with the spindle motor 16.

Although not shown, a transparent cover glass layer is formed on a surface of the disk 12, and a signal is recorded in accordance with a well-known method on a signal surface which is a hierarchical lower layer thereof. There are well-known signal recording methods such as a method by a pit which is a minute concave and convex, a method which performs a recording by allowing a difference in refraction and reflectivity, a method which performs a recording by allowing a difference in magnetopolarity, and so on. The present invention can be applied to a physical format of such an arbitrary optical disk. However, since such the kinds of various recording and reproducing principles are well known, its descriptions are herein omitted.

A light emitted from the optical pick-up 18 is focused on a signal surface of the disk 12, and forms a minute spot. The optical pick-up 18 is moved by a driving portion (not shown) along the shaft 20. Thus, the spot by the optical pick-up 18 is scanned in a two-dimensional manner on the disk 12. The signal is recorded on a signal surface of the disk 12 by an irradiation of the spot, and in addition, the signal is reproduced by the light irradiated onto the signal surface.

Although structure of an optical system to which the present invention is applied slightly differs depending on a difference of the above-described recording and reproducing methods, in FIG. 3 embodiment, an optical system of a case the disk 12 is a DVD-R/RW. However, the present invention is not limited thereto.

Figure 4:
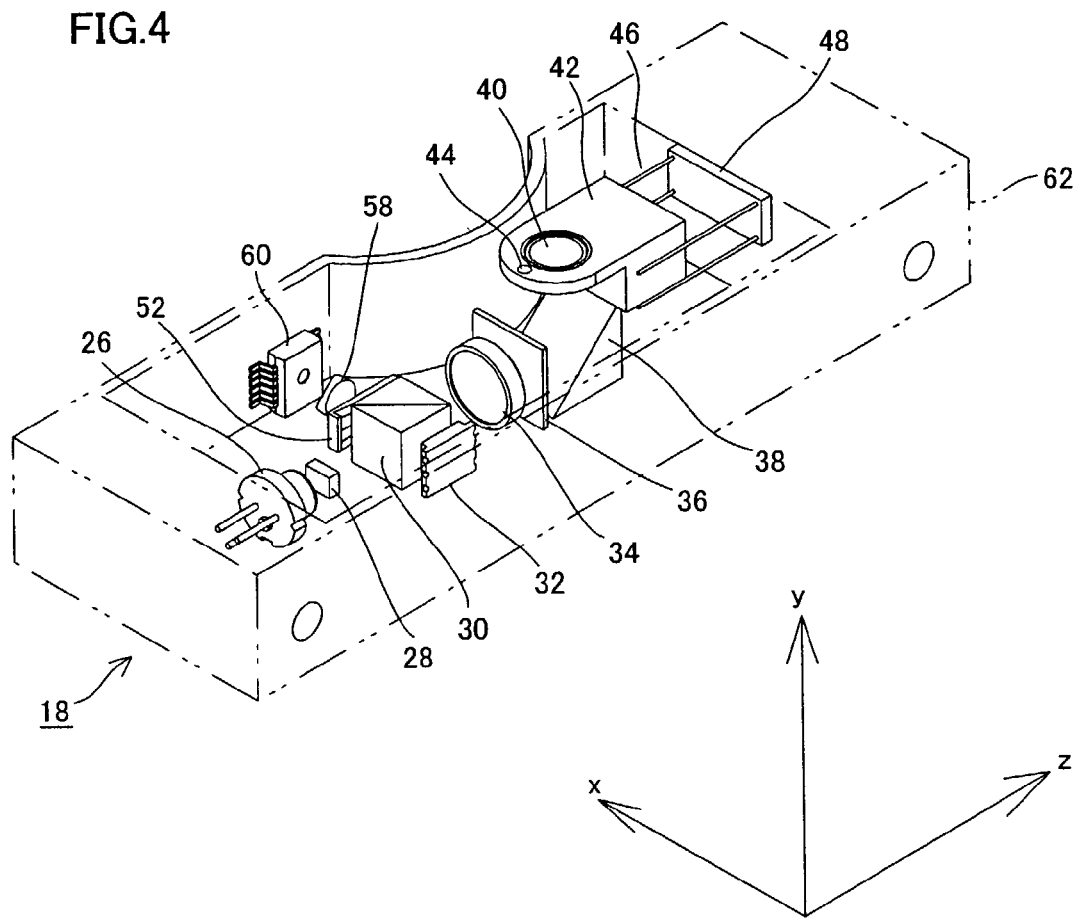
FIG. 4 is an illustrative view showing structure of an optical pick-up of FIG. 3 embodiment.

As shown in FIG. 4, inside a housing 62 of the optical pick-up 18, provided is a laser diode 26 which is a light source for recording and reproducing the signal, and a light from the laser diode 26 is incident on a diffraction grating 28. The diffraction grating 28 divides the incident light in three, and irradiates them into a polarizing beam splitter 30. The polarizing beam splitter 30 reflects or transmits the light in accordance with its polarization. On a side surface of its front side of the polarizing beam splitter 30, provided is a front monitor 32 for detecting an amount of light. In addition, at a front of the polarizing beam splitter 30, provided is a collimator lens 34 for converting a radiant light into a parallel light, and the light transmitted through the collimator lens 34 is applied to a ¼ (quarter) wave plate 36 which performs a conversion of a linearly polarized light and a circularly polarized light.

The light emitted from the ¼ wave plate 36 is reflected by a reflection mirror 38, and focused on the disk 12 through an object lens 40. The object lens 40 is fixedly held by an object lens holder 42. A penetration hole 44 which functions as a light transmitting portion is formed at a first location of the object lens holder 42 in a vicinity of the object lens 40 in a tangential direction of a track of the disk 12, that is, in a tangential direction of the object lens 40. The object lens holder 42 is held by a wire suspension 46, and the wire suspension 46 is held by a wire suspension plate 48.

Figure 6:
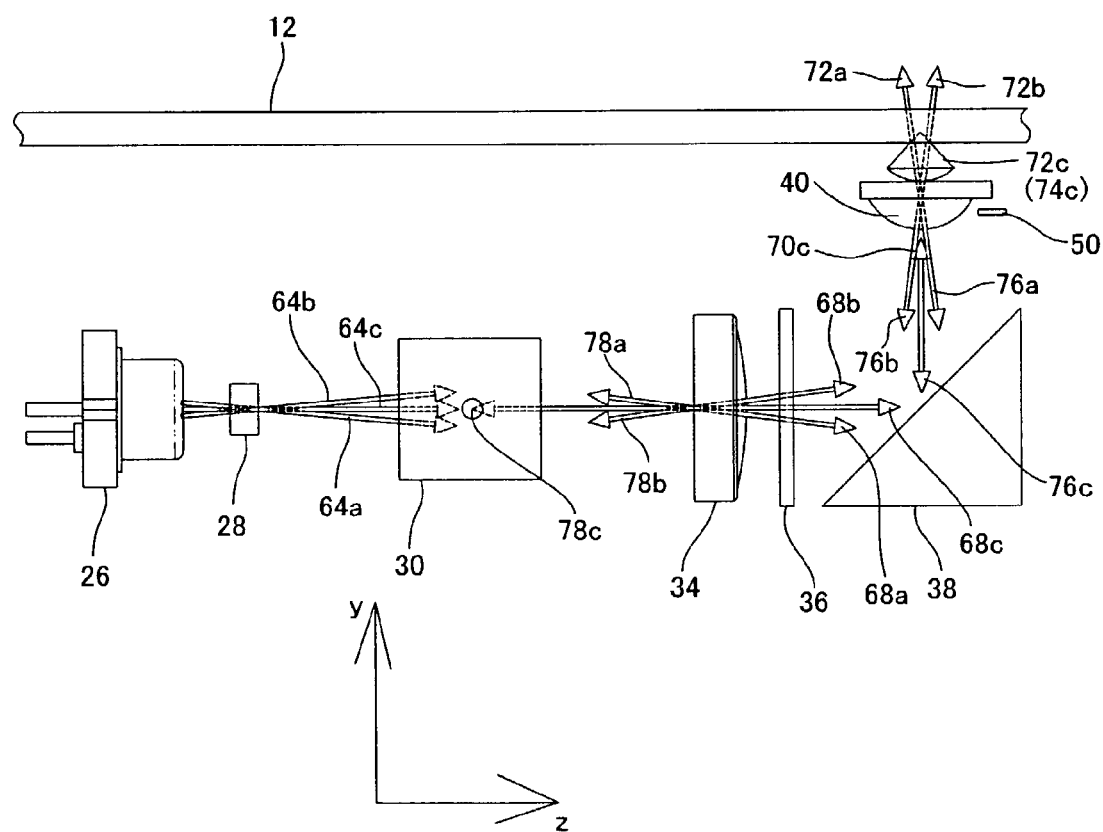
FIG. 6 is an illustrative view showing the sub-beams on a yz plane of FIG. 4 optical system.

Below the object lens 40 as shown in FIG. 6, a lens tilt mirror 50 for detecting a tilt of the object lens 40 is provided in an integrated manner with the object lens holder 42 at a second location which is an opposite side toward the penetration hole 44 sandwiching the object lens 40 in the above-described tangential direction.

Figure 5:
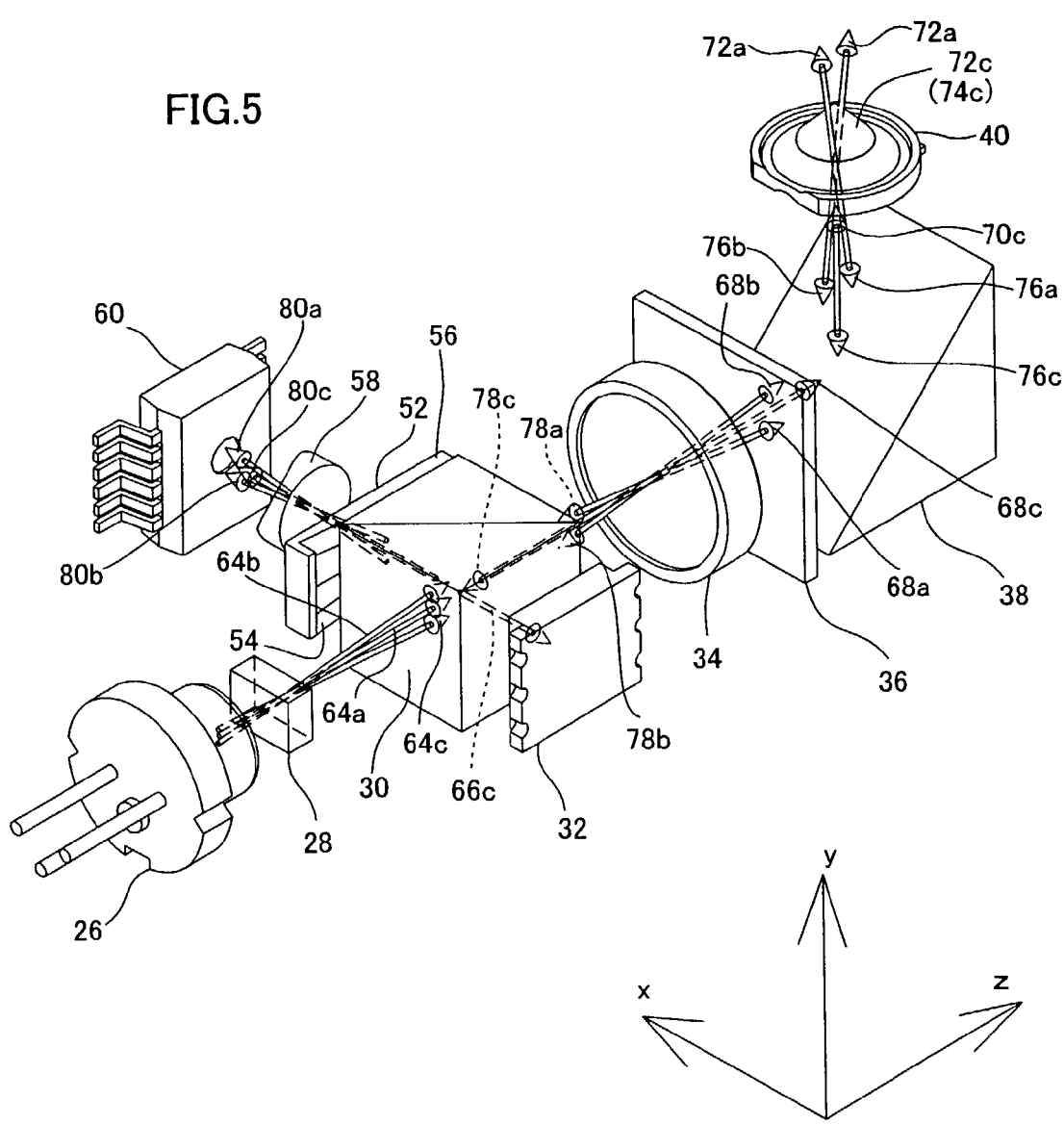
FIG. 5 is an illustrative view showing sub-beams in an optical system of FIG. 4.

In addition, as well understood from FIG. 4, a tilt prism 52 for detecting the tilt is provided on a side surface at a rear surface side of the polarizing beam splitter 30. The tilt prism 52 is provided at a location distant from the optical axis as shown in FIG. 5, and includes a prism 54 for changing a direction of a reflected light by refracting the reflected light on the disk 12 and a prism 56 for changing the direction of the reflected light toward an opposite direction of the prism 54 by refracting the reflected light by the lens tilt mirror 50, being distant toward an opposite direction of the prism 54. At a rear of the tilt prism 52, a cylindrical lens 58 for producing an astigmatism is provided, and a light-receiving sensor 60 receives a light from the cylindrical lens 58, and converts the light into an electrical signal (current or voltage).

Figure 7:
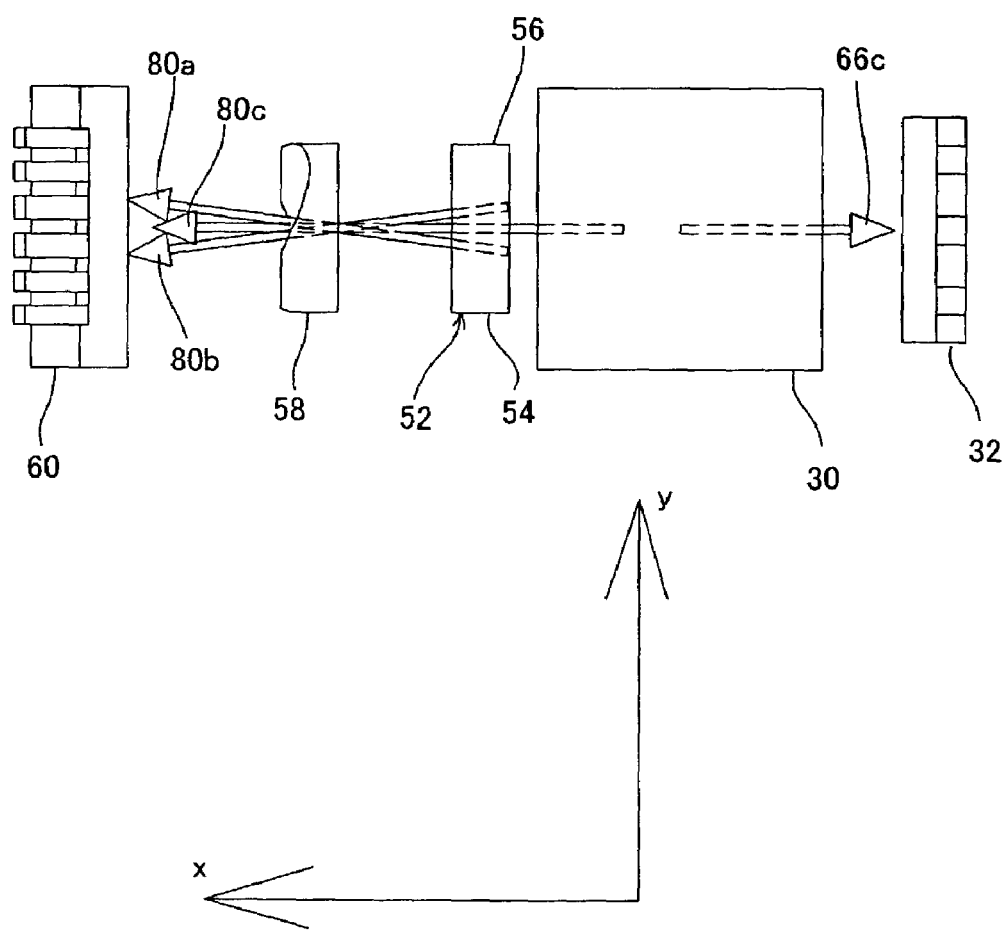
FIG. 7 is an illustrative view showing the sub-beams on an xy plane of FIG. 4 optical system.

Herein, a flow of a light used for a normal signal reproduction is described using FIG. 5–FIG. 7.

Lights 64a, 64b and 64c radially emitted from the laser diode 26 are spherical waves, and divided into three spherical waves each of which has a virtual light source by transmitting through the diffraction grating 28. The light 64c is a principal ray of a zero-order light using a light source of the laser diode 26 on the optical axis of the collimator lens 34. The light 64a and the light 64b are symmetrical with respect to the optical axis, and a principal ray of +(plus) primary light and −(minus) primary light having a virtual light source within a yz plane. The zero-order light becomes a main beam with a large amount of light, and used for recording and reproducing the signal. The ± primary light becomes two sub-beams with a small amount of light, and used for a tracking servo called as a differential push-pull method.

Firstly, a flow of the zero-order light is described. The polarizing beam splitter 30 divides a P wave component of the light into a spectrum of a transmitted light and a reflected light at a predetermined ratio such as 9:1, for example, and divides an S wave component into the spectrum of the transmitted light and the reflected light at a predetermined ratio such as 0:10, for example. In this optical system, since a plane of polarization of the linearly polarized light of the laser diode 26 is arranged to be parallel to the zx plane, all lights emitted from the laser diode 26 are rendered a P wave. Therefore, 1/10 of the entire amount of light is reflected, and irradiated on the front monitor 32 as a light 66c, and a remaining light 68c is transmitted.

The light 66c being incident to the front monitor 32 is converted into an electrical signal to be utilized for an automatic power control. An electrical signal in accordance with a difference between an electrical signal corresponding to a target amount of light and an output of the front monitor 32 is applied to a control circuit, e.g. a laser driver IC, and a current supplied to the laser diode 26 is controlled in such a manner that the electrical signal is kept at a predetermined value by a servo circuit (not shown) which thereby changes a value of the current supplied to the laser 26. Consequently, a main beam 70c emitted from the object lens 40 is kept at a predetermined optical power.

The light 68c transmitted through the polarizing beam splitter 30 is converted by the collimator lens 34 from a spherical wave to a plane wave, in other word, from a radiant light to a parallel light. The direction is parallel to the optical axis.

The parallel light converted by the collimator lens 34 is incident on the 1/4 wave plate 36, and thereby, the linearly polarized light is converted into the circularly polarized light. The circularly polarized light means a state that a phase of the P wave and the S wave of the light are deviated from each other by a 1/4 wavelength. In addition, the light 68c changes its direction on the reflection mirror 38, and is incident on the object lens 40 as a light 70c. The light 70c is focused on the signal surface of the disk 12 (light 72c), and reflected (light 74c). At this time, since the phase of the light is reversed by the reflection, in other words, the phase is changed by a 1/2 wavelength, a relationship of order of the P wave and the S wave having the phase deviated by 1/4 wavelength is reversed. That is, a rotation direction of the circularly polarized light is reversed.

The reflected light flows back an approaching route, and firstly transmits the 1/4 wave plate 36 (light 78c) after being converted by the object lens 40 into a parallel light 76c. At this time, the reflected light is converted from the circularly polarized light to the linearly polarized light. However, unlike an approaching route, since the direction of the circularly polarized light is reversed, a polarization plane of the converted linearly polarized light is rendered parallel to an S wave plane in the polarizing beam splitter 30, that is, rendered parallel to the yz plane.

Next, the parallel light from the 1/4 wave plate 36 is converted into a convergent light in the collimator lens 34, and incident on the polarizing beam splitter 30 as a light 78c. Since the light 78c is linearly polarized into the S wave, the light 78c is wholly (100%) reflected in the polarizing beam splitter 30, and a reflected light 80c changes its direction toward the light-receiving sensor 60.

When the light 78c reflected by the disk 12 returns to the laser diode 26, there will be a sudden increase of noises superposed on the reproduced signal. This is a so-called "returned light noise". It is possible to intercept or considerably reduce an amount of a returned light as in the above-described process by using the 1/4 wave plate 36 and the polarizing beam splitter 30.

Out of the light 80c headed for the light-receiving sensor 60, an effective luminous flux transmits between a pair of the tilt detection prism 54 and 56, and incident to the cylindrical lens 58. An edge line of the cylindrical lens 58 is tilted at an angle of 45 degrees toward the xy plane while the optical axis is rendered as an x axial direction. Therefore, an imagery position on the optical axis within this cross-section surface is not coincident with an imagery position within a cross-section surface perpendicular to this cross-section surface. A reason why such an astigmatism difference is produced is that an astigmatic method is used for the focus servo. Since the astigmatism method is a frequently used method and its principle is also well known, its descriptions are herein omitted.

The light 80c is converged on the optical axis near the light-receiving sensor 60 by the collimator lens 34 and the cylindrical lens 58. A reason that a term "converged" is used instead of "focused" is that since the light converged in the light-receiving sensor 60 by the astigmatism method has the astigmatic difference, it is not focused. The light-receiving sensor 60 is provided at an approximate intermediate position of respective imagery points on two cross-section surfaces defined by the above-described cylindrical lens 58.

Figure 8:
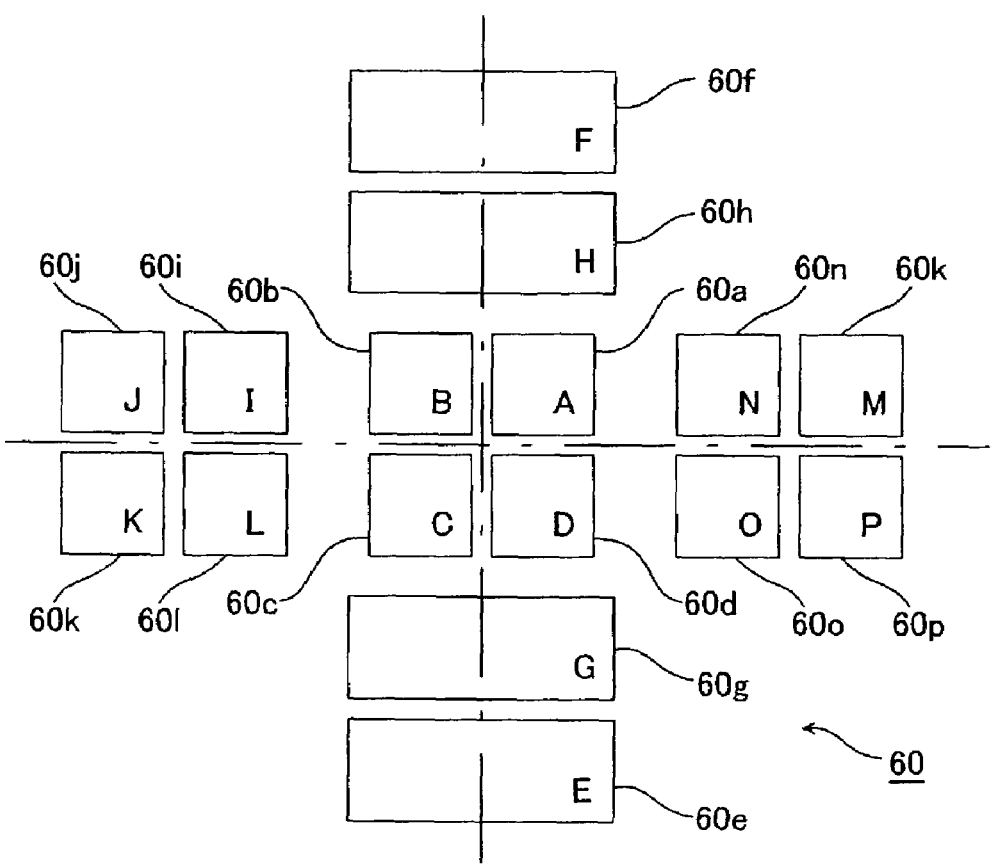
FIG. 8 is an illustrative view showing a divided arrangement of a light-receiving sensor in a case that a tilt detection-use sensor is divided in four in FIG. 3 embodiment.

The light 80c is converged into four-divided sensors 60a, 60b, 60c and 60d arranged on the optical axial position shown in FIG. 8. The light-receiving sensor 60 is divided into four parts so as to reproduce a recorded signal, and at the same time, to be used for the focus servo. However, its operation is well-known, and therefore, descriptions are herein omitted.

Next, referring to FIG. 5–FIG. 7, a flow of ± primary light is described. The principal rays 64a and 64b of ± primary light that are a diffused light emitted from the virtual light source are incident on the collimator lens 34, having a gradient with respect to the optical axis, and proceeds having the same gradient as the optical axis after being converted into the parallel light, and directions thereof are changed by the reflection mirror 38, and imaged by the object lens 40 on the disk 12 as the sub-beams. In the Figures, the lights 68a and 68b represent the ± primary light which transit a center of the collimator, and the lights 72a and 72b represent the ± primary light which transit a center of the object lens.

The ± primary lights 72a and 72b are focused on the signal surface of the disk 12 at locations in a longitudinal direction of the track of the disk 12 from the optical axis and oppositely distant with each other. The reflected lights 76a and 76b are converted into the parallel light by the object lens 40, and directions thereof are the same as when irradiated. Then, the lights are converged on the light-receiving sensor 60 by the collimator lens 34 and the cylindrical lens 58 (80a, 80b). A reason why a term "converged" is used instead of "focused" is the same as in the above. The lights 80a and 80b represent a direction of the light which transits a center of the cylindrical lens, and converged on an extension thereof.

The lights 80a and 80b are incident into two-divided sensors 60e, 60f, 60g and 60h oppositely distant with each other toward the y direction from the optical axis as shown in FIG. 8. These two-divided sensors are sensors used for detecting de-track of the sub-beams in the above-described differential push-pull method. Since its dividing direction is included in a principle similar to the above, and well known, the descriptions are herein omitted.

Subsequently, the tilt servo is described. Firstly, a deterioration of the spot on the signal surface is described in respective cases that the disk 12 is tilted and the object lens 40 is tilted so as to describe a method which compensates or cancels an influence of the disk tilt by the lens tilt. Next, an optical route in this embodiment is described, and then, a detection method of the tilt is described. Furthermore, an operation of the tilt servo is described.

Figure 9:
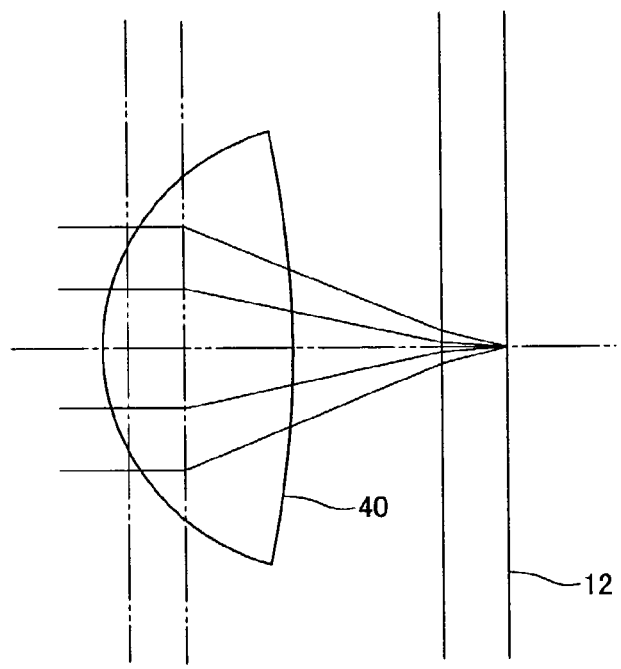
FIG. 9 is an illustrative view showing a state of an optical beam from an object lens to a disk in a case of absence of a disk tilt.
Figure 10:
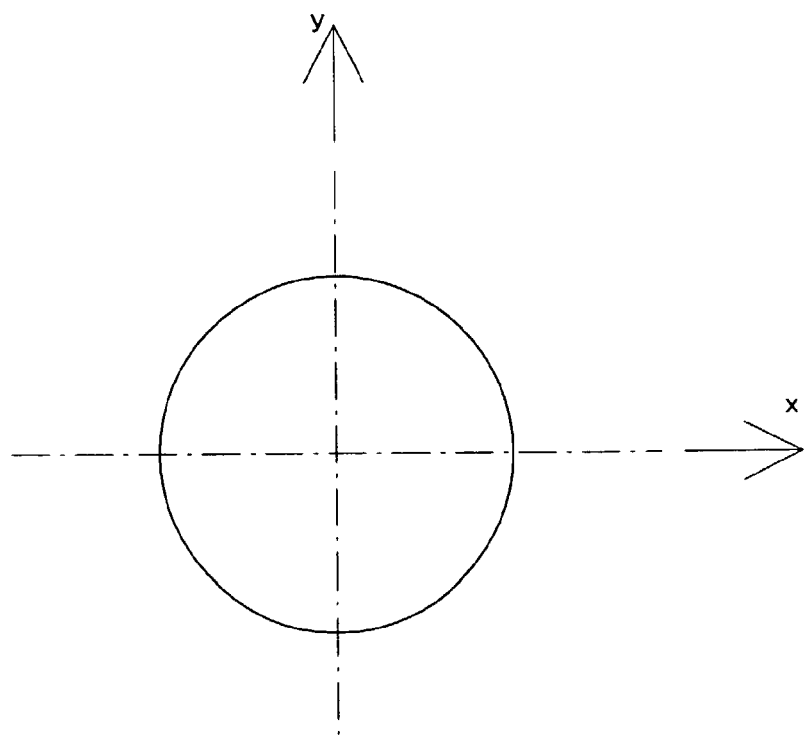
FIG. 10 is an illustrative view showing an imagery spot on a disk signal surface observed from an opposite side toward the object lens in FIG. 9.

Firstly, a spot in a case that only the disk 12 is tilted is considered. FIG. 9 shows a state of a ray in a case of absence of the tilt. Since the object lens 40 is designed with a spherical aberration so that a spherical aberration is generated by a disk thickness can be canceled, the spherical aberration is not generated on the spot on the signal surface of the disk 12. FIG. 10 is a pattern diagram showing an imagery spot on the disk signal surface observed from an opposite side of the object lens in this case, and a condensing center of the light ray distant from the optical axis is coincident with the imagery center of a paraxial ray.

Figure 11:
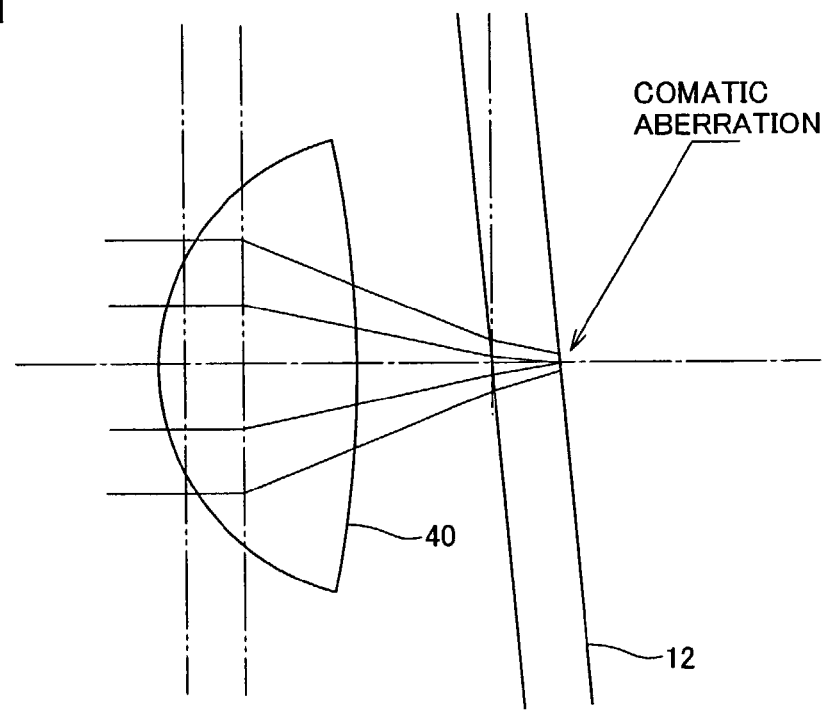
FIG. 11 is an illustrative view showing a state of the optical beam from the object lens to the disk in a case of presence of the disk tilt.
Figure 12:
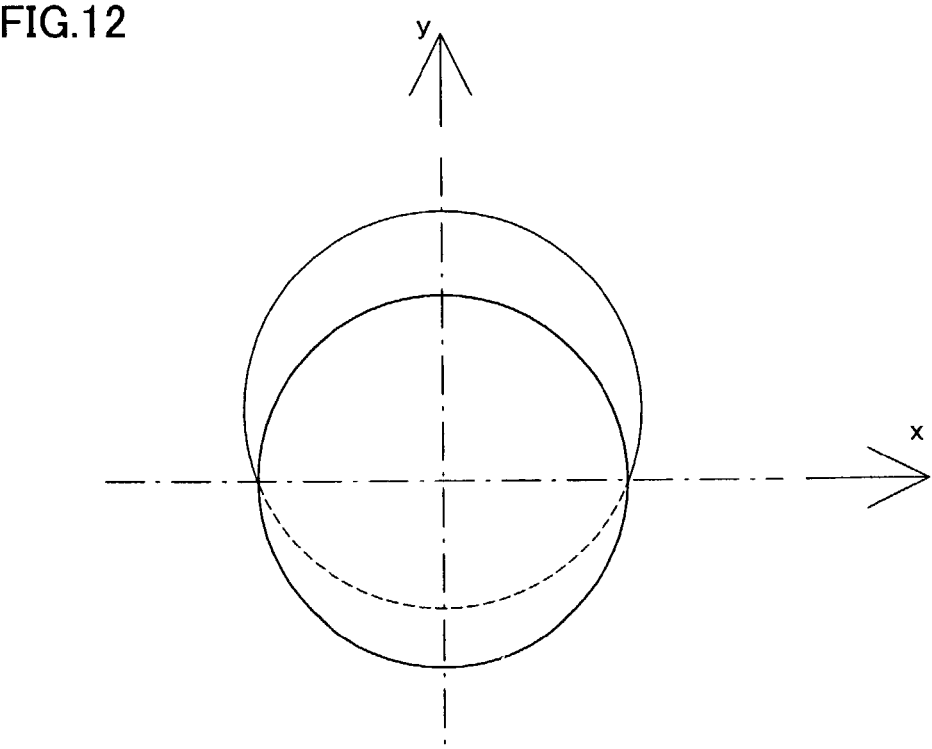
FIG. 12 is an illustrative view showing an imagery spot on the disk signal surface observed from an opposite side toward the object lens in FIG. 11.

A state of a light in a case that the disk 12 is tilted is shown in FIG. 11. An imagery spot on the disk signal surface observed from an opposite side of the object lens, which is in this case, is shown in FIG. 12. As understood from FIG. 12, a condensing center of the light ray distant from the optical axis is distant toward a side that an interval or space between the disk 12 and the object lens 40 is narrowing from the imagery center of the paraxial ray by the tilt of the disk 12. This state is a state that the comatic aberration is generated.

Figure 13:
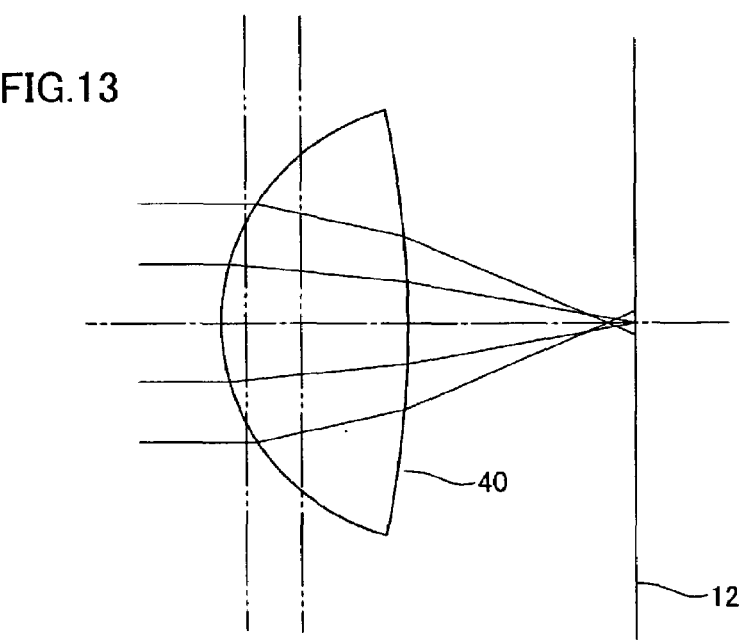
FIG. 13 is an illustrative view showing a state of the optical beam from the object lens to the disk in a case of absence of an object lens tilt.
Figure 14:
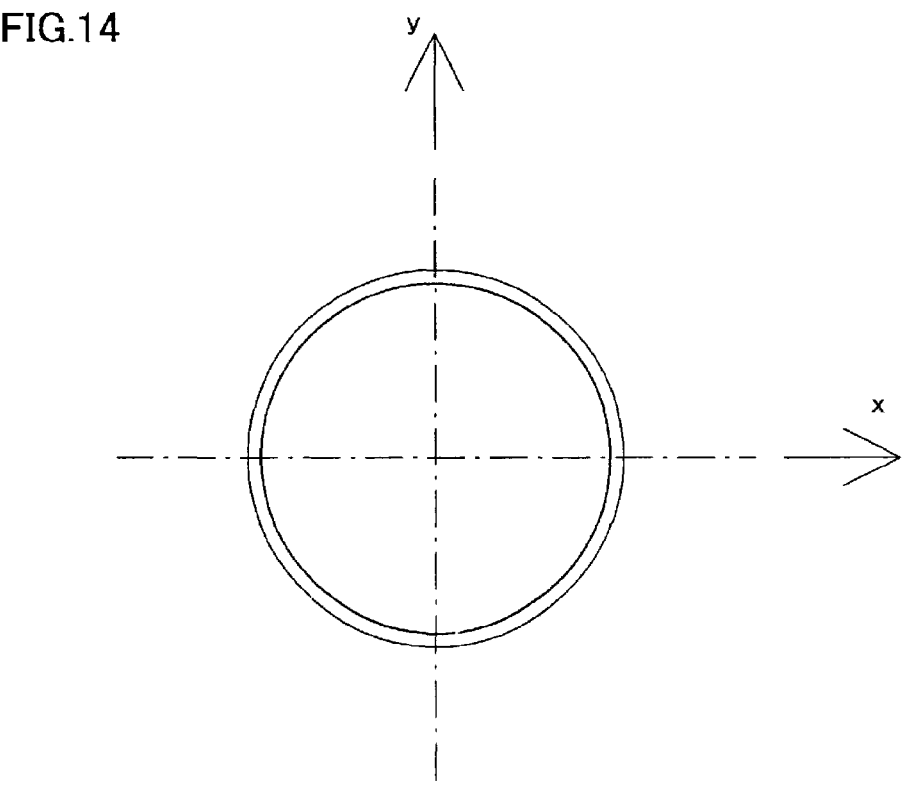
FIG. 14 is an illustrative view showing an imagery spot on the disk signal surface observed from an opposite side toward the object lens in FIG. 13.

Nest, a spot in a case that only the object lens 40 is tilted is considered. FIG. 13 shows a state of a ray in a case of absence of the lens tilt. In FIG. 13, it is assumed that there is no disk thickness in order to consider only an influence of the object lens tilt. On the other hand, the lens is simply a spherical lens, and the spherical aberration is produced accordingly. FIG. 14 is a pattern diagram showing an imagery spot on the disk signal surface observed in this case from an opposite side of the object lens 40, and the condensing center of the light ray distant from the optical axis is coincident with the imagery center of the paraxial ray.

Figure 15:
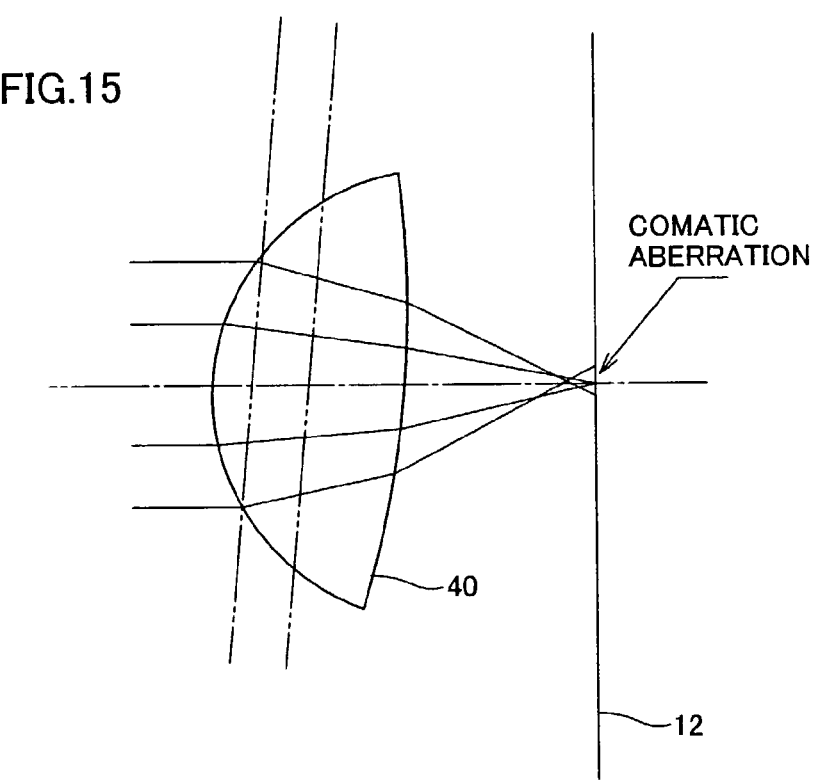
FIG. 15 is an illustrative view showing a state of the optical beam from the object lens to the disk in a case of presence of the object lens tilt.
Figure 16:
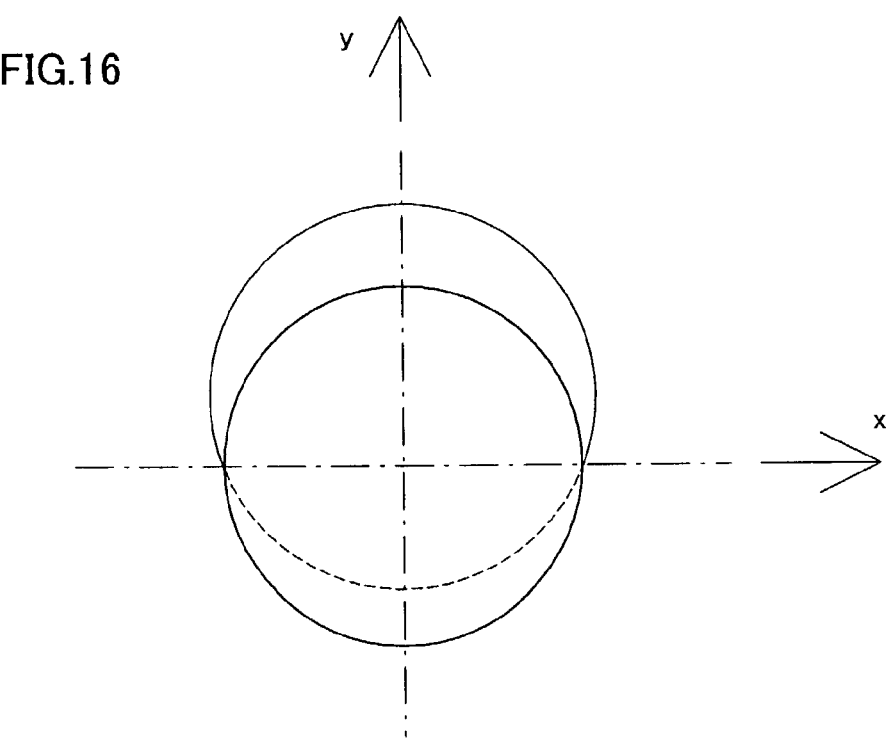
FIG. 16 is an illustrative view showing an imagery spot on the disk signal surface observed from an opposite side toward the object lens in FIG. 15.

Contrary thereto, FIG. 15 shows a state of the light ray in a case that the object lens 40 is tilted. FIG. 16 shows an imagery spot on the disk signal surface observed in this case from an opposite side of the object lens 40. In this case, similar to the preceding disk tilt case (FIG. 12), the condensing center of the light ray distant from the optical axis is condensed toward a side which the interval or space between the disk 12 and the object lens 40 is narrowing by the tilt of the object lens 40 from the imagery center of the paraxial ray. This state is a state that the comatic aberration is generated.

Figure 17:
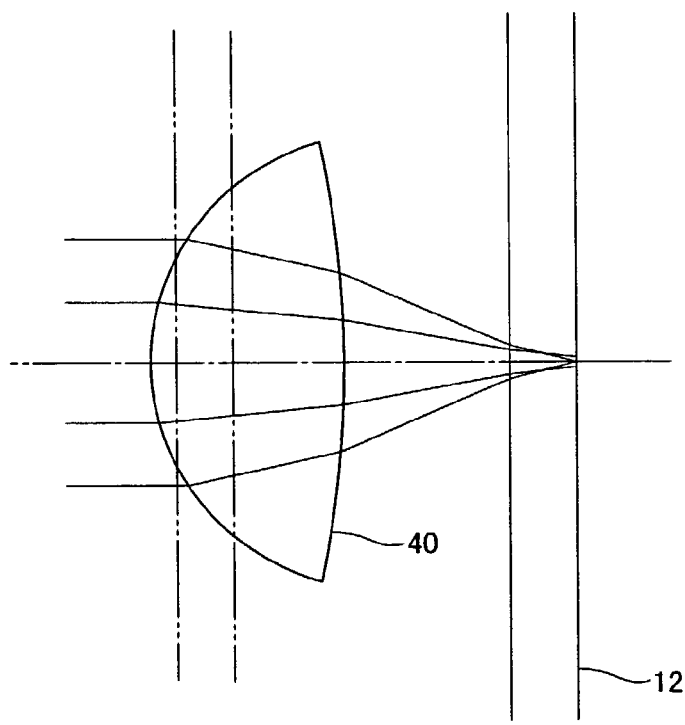
FIG. 17 is an illustrative view showing a state of the optical beam from the object lens to the disk in a case of absence of a light ray tilt.

Furthermore, a spot in a case that the light ray incident to the object lens 40 is tilted is considered. In this case, there are influences of both the lens tilt and the disk tilt. A state of the light ray in a case of absence of the light ray tilt is the same as in the preceding FIG. 13. However, the object lens 40 is assumed to be a spherical lens which finds easy to track the light ray, and in addition, the disk 12 has a thickness, and in this case, a spherical aberration is thus generated on the spot on the disk signal surface as shown in FIG. 17. The imagery spot on the disk signal surface observed in this case from an opposite side of the object lens 40 is the same as in the preceding FIG. 14, and the condensing center of the light ray distant from the optical axis is coincident with the imagery center of the paraxial ray.

Figure 18:
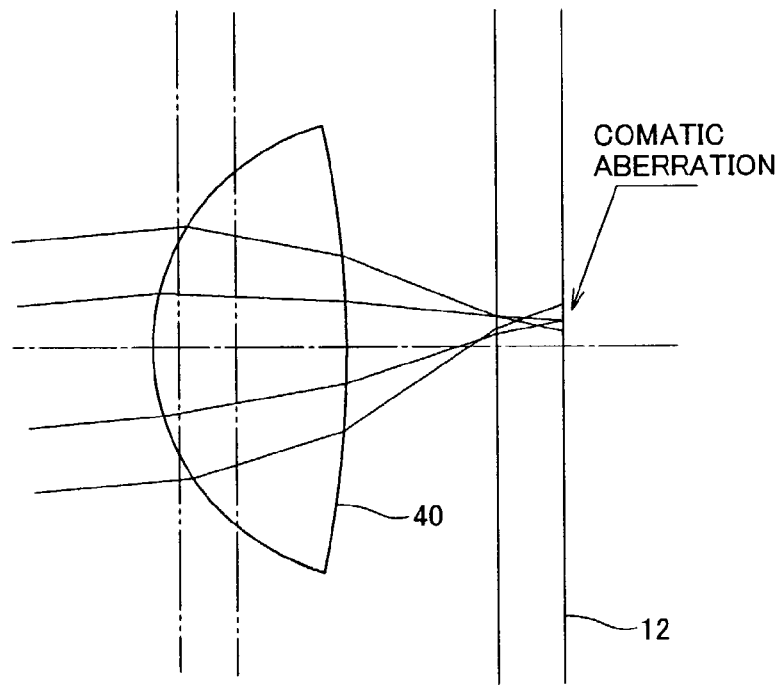
FIG. 18 is an illustrative view showing a state of the optical beam from the object lens to the disk in a case of presence of the light ray tilt.
Figure 19:
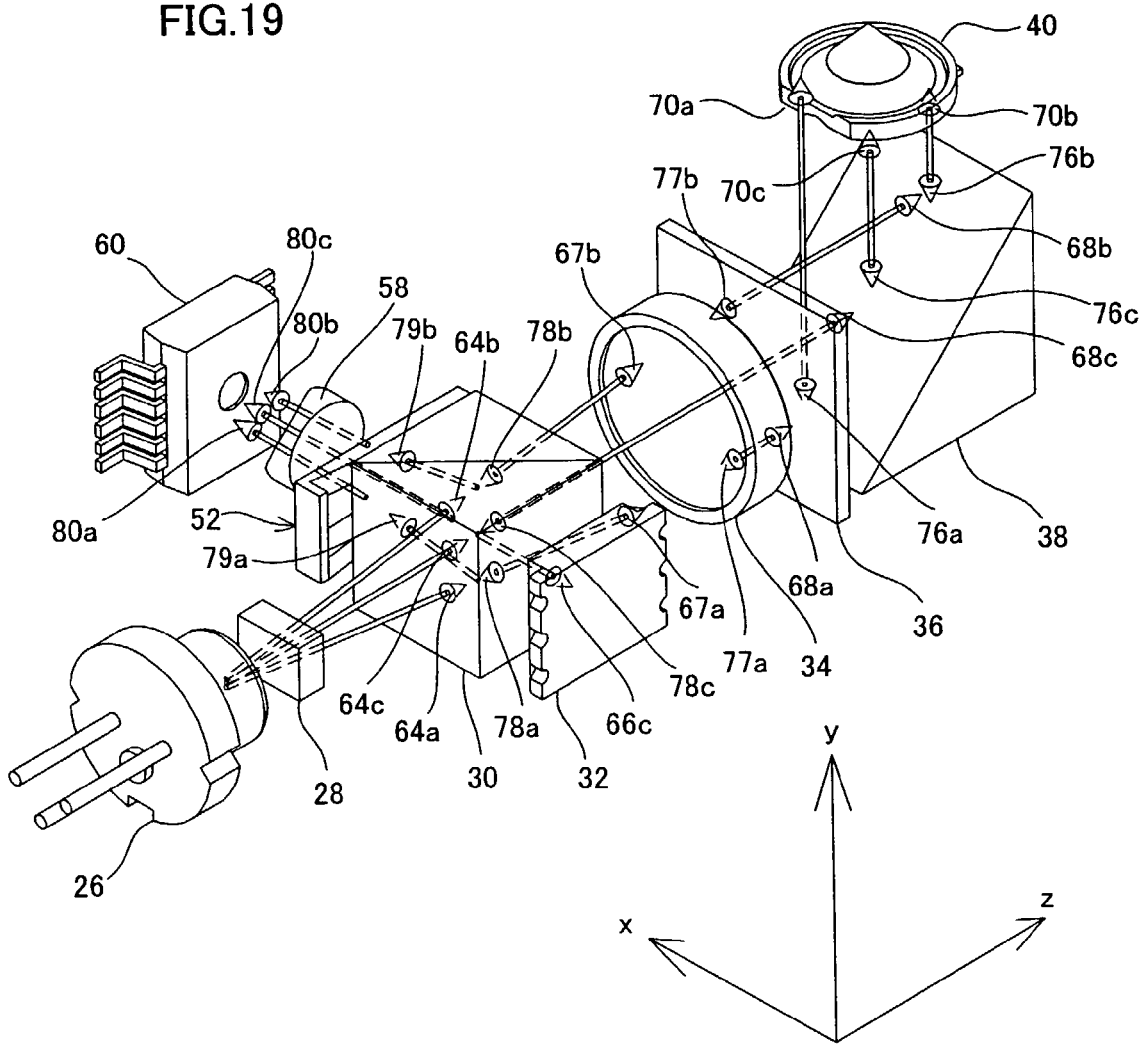
FIG. 19 is an illustrative view showing a light ray in an optical system of the optical pick-up in FIG. 4.
Figure 20:
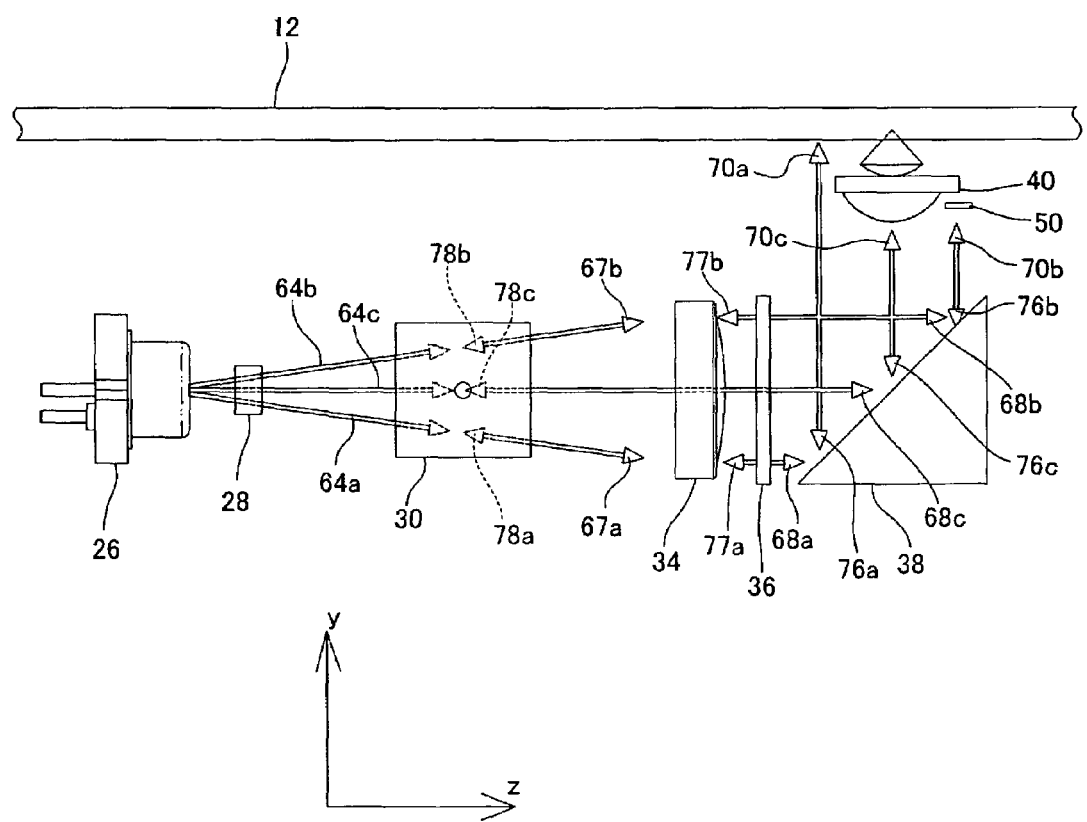
FIG. 20 is a front view showing a light ray on a yz plane in the optical system in FIG. 4.
Figure 21:
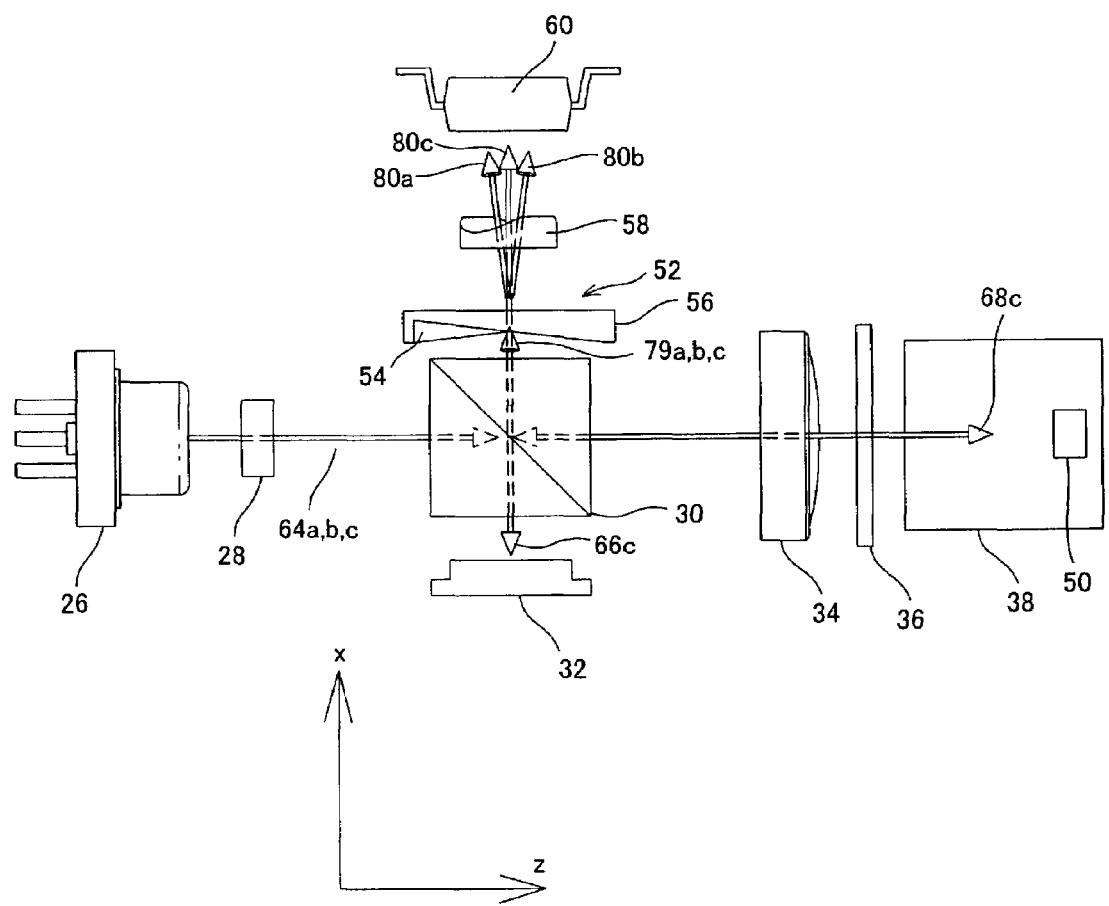
FIG. 21 is an upper surface view showing the light ray on a zx plane in the optical system in FIG. 5.
Figure 22:
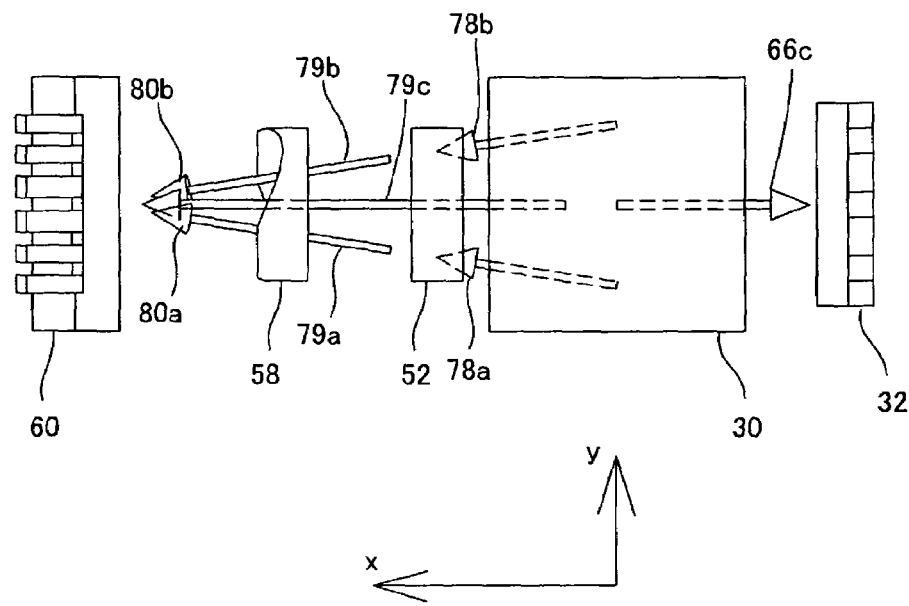
FIG. 22 is a side surface view showing the light ray on an xy plane in the optical system in FIG. 5.

In contrary thereto, FIG. 18 shows a state of a light ray in a case that the incident light is tilted. In this case, the comatic aberration is generated in the imagery on the signal surface, and this results in such the spot as in the preceding FIG. 16 if the imagery spot on the disk signal surface is observed from an opposite side of the object lens 40. That is, the gradient of the light ray brings the condensing center of the light ray, distant from the optical axis distant, toward an incidence light proceeding direction side from imagery center of the paraxial ray, allowing the comatic aberration to be produced.

It may be appropriate to apply the tilt to the object lens 40 toward an opposite direction of FIG. 15 in order to compensate or cancel the comatic aberration generated by the disk tilt as shown in FIG. 11. This means that the object lens 40 is slanted toward such a direction that the object lens 40 is rendered parallel to the disk 12, however, if rendered completely parallel thereto, it will be the same state as the light ray tilt shown in FIG. 18, thus not compensating or canceling the comatic aberration. Therefore, a tilt state which stops short thereof is appropriate.

In the optical pick-up, the parallel light is incident to the object lens in a state that an amount of light distribution is as even as possible in order to make the beam spot narrower as much as possible. That is, out of an intensity distribution of the parallel light which constitutes a Gaussian distribution, only a relatively flat portion in a vicinity of a center portion is allowed to irradiate. Therefore, a remaining portion is to be eclipsed by an object lens pupil. Since the eclipsed light is put to good use for detecting the tilt in the present invention, an additional light source is not necessary, and in addition, there is no need that an output of a semiconductor laser, which is for generating an original beam, is raised.

The tilt detection is described based on FIG. 19–FIG. 22. It is pointed out in advance that with respect to reference numerals showing respective lights, the same or similar reference numerals as in FIG. 5–FIG. 7 showing the previously-described normal operation are used in these Figures.

The light 64a and 64b, which are portions of the difused light emitted from the laser 26, become lights 67a and 67b after being transmitted through the polarizing beam splitter 30, and become parallel lights 68a and 68b by the collimator 34. Next, the lights 70a and 70b reflected by the reflection mirror 38 are not incident on the object lens 40, and the light 70a transits through the penetration hole 44 shown in FIG. 4, is irradiated onto the surface of the disk 12, and reflected as the light 76a. Another light 70b is reflected by the mirror 50 attached to one portion of the lens holder 42 which secures and holds the object lens 40, and becomes the light 76b.

However, it may be possible that the mirror 50 is omitted, and the reflected light from the flat portion of the object lens 40 which does not have a lens effect is used as the light 76b. That is, the mirror 50 may be provided as a reflection portion or a flat flange portion of the object lens 40 may be used.

Since the object lens 40 moves toward a radial direction, that is, an x direction in Figures for a purpose of the tracking, it is difficult to use a light eclipsed in the radial direction for the tilt detection. On the other hand, since there is no lens shift in a tangential direction, that is, a z direction in Figures, the light eclipsed in a vicinity of the lens is easier to be used. In this case, the penetration hole 44 is formed as a light transmitting portion in a vicinity of the lens of the object lens holder 42 at a place distant toward the tangential direction or the light transmitting portion is formed by deleting (cutting) one portion of the object lens holder 42.

An aperture may be used on the reflection surface for detecting the tilt of the object lens 40 in order to limit a luminous flux of the reflected light so as not to give an adverse effect on the detection of the recorded signal as a stray light The reflected lights 76a and 76b change its direction on the reflection mirror 38, and become lights 77a and 77b. Furthermore, after being converted into convergent lights 78a and 78b by the collimator lens 34, these lights are reflected by the polarization beam splitter 30, and incident on the tilt detection prism 52 (light 79a, 79b).

The reflected light 79a by the disk 12 changes the light direction by the tilt detection prism 54 toward the radial direction, that is, the z direction in Figures, and as a light 80a, is incident on four-divided sensors 60i, 60j, 60k and 60l for the disk tilt detection shown in FIG. 8.

The reflected light 79b on the lens tilt mirror changes the light direction by the tilt detection prism 56 toward the radial direction, which is a direction toward an opposite direction of the light 79a, and, as a light 80b, is incident on four-divided sensors 60m, 60n, 60o and 60p for the lens tilt detection shown in FIG. 8 The lights 80a and 80b are incident to be deviated toward the radial direction from the optical axis, so that the sensors 60i, 60j, 60k, 60l, 60m, 60n, 60o and 60p are located to be deviated toward the radial direction from the optical axis. This is to avoid the ± primary beam distantly incident toward the tangential direction in a case of using the differential push-pull method for the tracking.

In addition, since the lights 80a and 80b are reversely angled, it is possible to split the mutual lights so as to make a detection by arranging sensors separately, sandwiching the optical axis.

Figure 23:
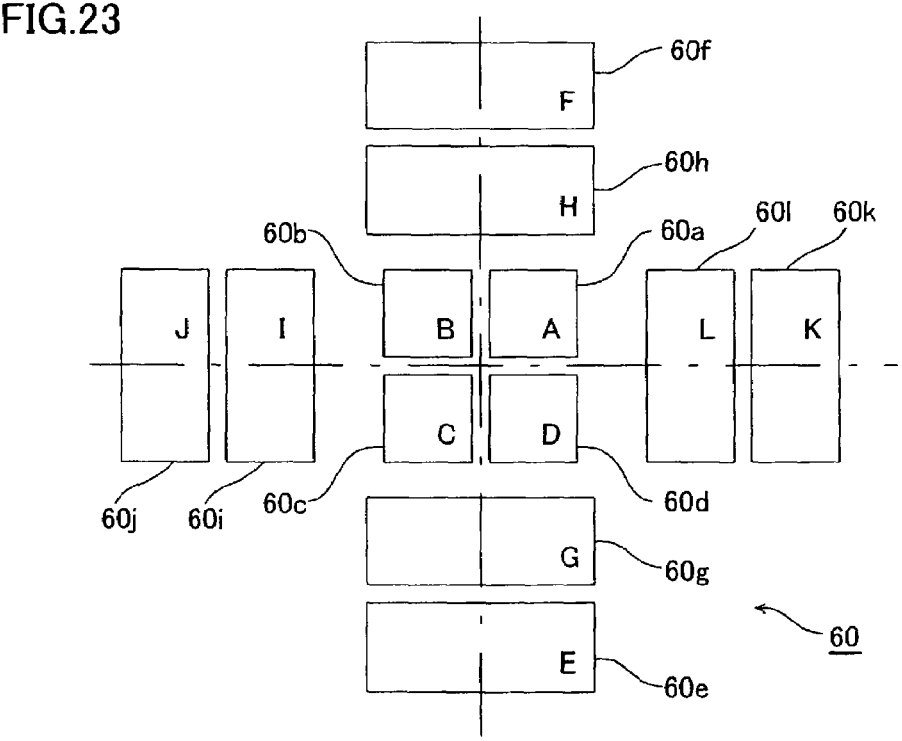
FIG. 23 is an illustrative view showing a divided arrangement of a light-receiving sensor in a case that a tilt detection-use sensor is divided in two in FIG. 3 embodiment.

Herein, the four-divided sensors are used in order to respond to both the radial tilt and tangential tilt. However, if either one of the radial or the tangential detection is enough, two-divided sensors may be appropriate. A state of the split sensor in a case of detecting only the radial tilt is shown in FIG. 23.

The lights 67a and 78a, the lights 68a and 77a, and the lights 70a and 76a are illustrated in a reverse direction at a same angle, respectively. However, it is a case only when the light 70a is perpendicularly irradiated to the disk 12. If it is not perpendicularly irradiated, the angle of these lights are deviated, and its direction becomes approximately reversed. In addition, the lights 67b and 78b, the lights 68b and 77b, and the lights 70b and 76b are illustrated in a reverse direction at a same angle. However, it is the case only when the light 70b is perpendicularly exposed toward the lens tilt mirror 50. If it is not perpendicularly irradiated, the angles deviate, and its direction becomes approximately reversed.

The light on the sensor is defocused due to the astigmatism method. However, it may be focused in a case that the astigmatism method is not used.

Since the parallel light is irradiated to the disk, no concentration of an optical power occurs, and if exposed at a recording optical power, a recorded portion is not deteriorated due to a deletion or an overwriting. In addition, since it is the parallel light, a diffraction is not caused by pits or grooves on the disk even if the reflected light is by the disk converged.

Figure 24:
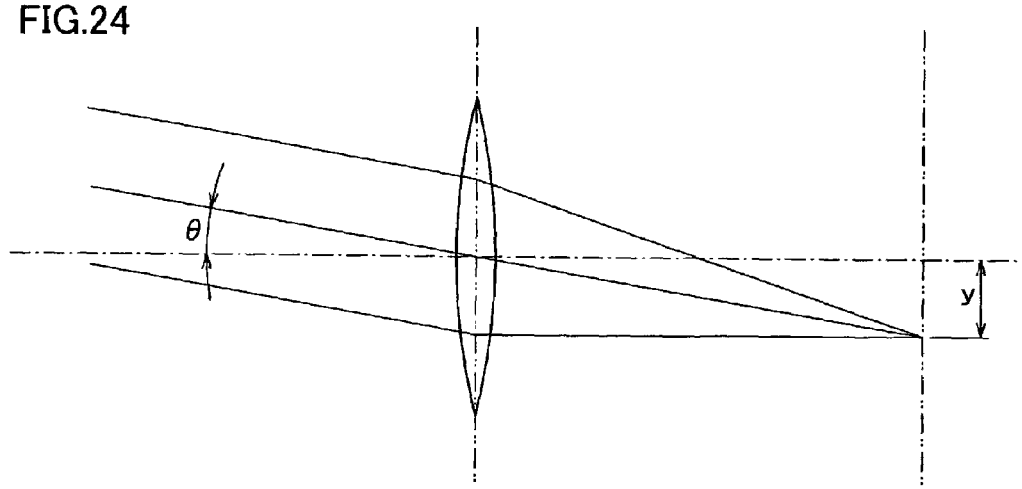
FIG. 24 is an illustrative view showing an image height where a parallel light upon which a light ray slanted toward an optical axis is incident is focused.

Firstly, a principle of the tilt detection is described using FIG. 24. FIG. 24 shows a conventional concave lens and a parallel light that a light ray tilted with respect to the optical axis by an angel θ degrees is incident. The light ray is focused at a position distant by an image height y from the optical axis. Provided that a focal length of the lens be f, a relationship of y=f*sin θ is established. If θ is small, which is approximated to sin θ≈θ, y≈f*θ is established, allowing y to be proportional to θ. Therefore, if it is possible to detect the image height, it becomes possible to detect a gradient of the incident light.

This principle is herein applied to the optical route in this embodiment. If the disk 12 having a warp is attached, it becomes a state of the radial tilt and the tangential tilt. The reflected light 76a of the parallel light 70a irradiated onto the disk 12 changes its direction in accordance with a gradient of the disk 12. Since the direction incident on the collimator lens 34 is also slanted, the image height changes in accordance therewith.

Furthermore, if an actuator 22 (FIG. 3) on which the lens 40 is mounted is changed its gradient by any means, the reflected light 76b of the parallel light 70b irradiated onto the lens tilt mirror 50 formed on one portion thereof changes its direction in accordance with the gradient of the actuator 22. Then, the direction irradiated to the collimator lens 34 is also slanted, the image height is changed in accordance therewith.

Next, a method of detecting the image height is described using a case that the light-receiving sensor is the four-divided sensors. For the sake of simplicity, the reflected light 80a is assumed to be incident on a center of the four-divided sensors 60i, 60j, 60k and 60l in a state that no disk tilt occurs.

Currents which flow in accordance with an amount of light are defined as Ii, Ij, Ik and Il. If the beam falls on the center of the entire four-divided sensor, Ii, =Ij, =Ik=Il is established. If deviated from the center, these become an unbalance.

If the disk 12 is tilted toward the radial direction, a position on which the reflected light 80a is incident moves toward an aligning direction of the sensor 60i and the sensor 60j or toward an aligning direction of the sensor 60l and the sensor 60k. If slanted toward the tangential direction, a position on which the reflected light 80a is incident moves toward an aligning direction of the sensor 60i and the sensor 60l or toward an aligning direction of the sensor 60j and the sensor 60k.

As for a characteristic value representing the image height, that is, a current unbalance, (Ii+Il)−(Ij+Ik) is used for the radial direction. For the tangential direction, (Ii+Ij)−(Ii+Ik) is used.

Likewise, a case that the object lens is tilted is described. For the sake of simplicity, the reflected light 80b is assumed to be incident on a center of the four-divided sensors 60m, 60n, 60o and 60p in a case of absence of the lens tilt. Currents which flow in accordance with the amount of light are herein Im, In, Io and Ip. If fallen on the center of the entire beam four-divided sensors, Im=In=Io=Ip is established. If deviated from the center, these become an unbalance.

When the object lens 40, that is, lens tilt mirror 50 is tilted toward the radial direction, the position on which the reflected light 80b is incident moves toward an aligning direction of the sensor 60m and the sensor 60n or toward an aligning direction of the sensor 60p and the sensor 60o. If slanted toward the tangential direction, the position on which the reflected light 80b is incident moves toward an aligning direction of the 60m and the sensor 60p or toward an aligning direction of the sensor 60n and the sensor 60o.

As for a characteristic value representing the image height, that is, a current unbalance, (Im+Ip)−(In+Io) is used for the radial direction. For the tangential direction, (Im+In)−(Ip+Io) is used.

A sign of these characteristic values makes it possible to detect the tilt direction, that is, a plus (+) or minus (−) of the angle. Although neither of them is shown, these operations may be realized by an exclusive hardware circuit, or it may be also possible to operate by a computer by inputting them into the computer after current values are A/D-converted. That is, the optical disk apparatus 10 of the embodiment has a control circuit (not shown), and an operating circuit and a computer are included in the control circuit.

Although above is described using the four-divided sensors, two-divided sensors may be appropriate in a case that one of the radial tilt and the tangential tilt is detected, and a similar detection is also possible in this case. Only a difference from a case of the four-divided sensors, taking a detection of the radial tilt as an example, is described using FIG. 23.

The reflected light 80a is incident on the two-divided sensors 60i and 60j, and currents which flow in accordance with the amount of light are rendered Ii and Ij. If the disk 12 is tilted toward the radial direction, the position on which the reflected light 80a is incident moves toward an aligning direction of the sensor 60i and the sensor 60j. With respect to the radial direction, (Ii−Ij) is used as a characteristic value which represents the image height, that is, a current unbalance.

Likewise, the reflected light 80b is incident on the sensors 60k and 60l, and currents which flow in accordance with the amount of light are rendered Ik and Il. If the lens 40, that is, the lens tilt mirror 50 is slanted toward the radial direction, the position on which the reflected light 80b is incident moves toward an aligning direction of the sensor 60k and the sensor 60l. With respect to the radial direction, (Ik−Il) is used as a characteristic value which represents the image height, that is, a current unbalance.

In order to compensate or cancel the comatic aberration generated by the disk tilt by the comatic aberration generated by the object lens tilt, it may be appropriate to slant the object lens toward the same direction as the disk tilt. This means that the lens is slanted toward a direction in which the lens is rendered parallel to the disk. However, if rendered completely parallel thereto, it becomes the same state as the light ray tilt, thus not compensating the comatic aberration. Therefore, a tilt state which stops short thereof is appropriate.

Consequently, it may be appropriate to examine in advance the disk tilt amount and the tilt amount of the object lens which compensates or cancels the comatic aberration thereby, and tilt the lens in accordance with the aforementioned relationship after the disk tilt amount is detected, which is determined by designing the lens, thus not requiring to set pick-up by pick-up.

With respect to an actual operation, a servo control is applied by adjusting the gradient of the object lens in such a manner that a difference of the disk tilt characteristic value and the lens tilt characteristic is rendered zero after multiplying one of the characteristic values by a coefficient. That is, a direction toward which the object lens is slanted is determined depending on a sign of an operation result, and a slanting amount is determined by an absolute value of the operation result, thereby continually repeating loop of the detection, the operation, and the adjustment.

In a case of absence of the tilt, the lights 80a and 80b are respectively incident on an approximate center of the entire four-divided sensors, however, it is not necessarily the exact center thereof. Although the characteristic value does not become zero if deviated from the center, it may be possible to subtract the deviated amount from the characteristic value, recognizing that amount as an offset value, or increase a target value in the tilt servo by that amount. In addition, even if being incident on the exact center, the offset value is produced to the characteristic value by outputs of the four-divided sensors or offsets of outputs of other circuits. The offset values are measurable in a manufacturing process. The pick-up is positioned normally toward the disk toward a disk without a warp and respective characteristic values may be measured in a state that the object lens is slanted so that the comatic aberration is not generated on the disk.

In a case that both the DVD and CD are recorded or reproduced by a single optical pick-up, it is necessary that the tilt of two types of disk thicknesses are corresponded by the same object lens. In such a case, a disk tilt amount and a tilt amount of the object lens which compensates or cancels the comatic aberration generated thereby may be separately examined depending on whether the CD is used or the DVD is used, and the tilt servo may be applied to each of them in correspondence therewith.

In addition, in a case that both the DVD and the CD are recorded or reproduced by a single optical pick-up and separate light sources are used within the optical pick-up, the tilt detection signal when a horizontal disk with no warp is mounted is not always coincident with the both light sources. This is due to a fact that a direction of the parallel light headed for the disk after transmitting the collimator lens is not coincident when there is an error in position of the both light sources. In such a case, the offset values may be separately measured. Although the CD and the DVD are herein used as an example, a type of the disk is not questioned.

With regard to a method that a gradient of the object lens is actually adjusted in receipt of the detection of the disk tilt, various methods are already reported, and the present invention does not adhere to a specific method.

Second Embodiment

Referring to FIG. 25–FIG. 31, only the disk tilt detection method described in the first embodiment which is applied to the prior art 1 is described as a second embodiment.

Figure 25:
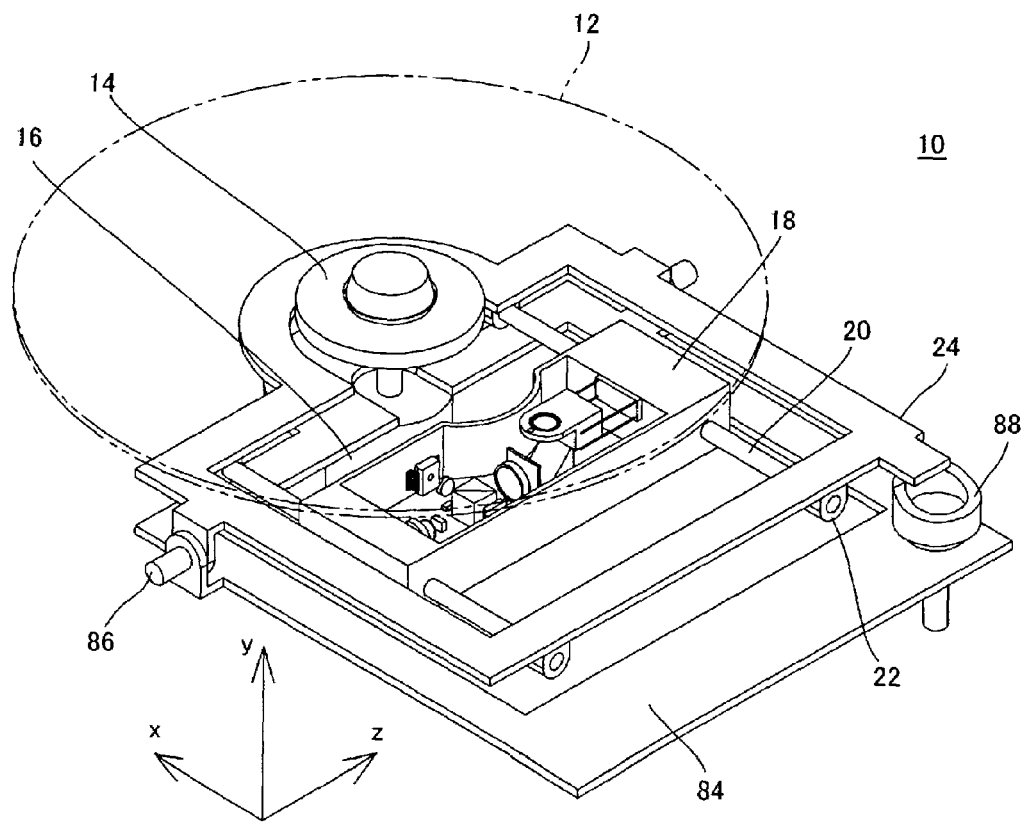
FIG. 25 is an illustrative view showing another embodiment of the present invention except for a control circuit portion.

In an optical disk apparatus 10 shown in FIG. 25, a disk 12 that is a recording/reproducing body of signals is held by a holding portion 14, rotated by a spindle motor 16, and received an irradiation of light from an optical disk 18, thereby recording a signal to the disk 12 or reproducing the signal from the disk 12. The optical pick-up 18 is held to be movable toward an axial direction of a shaft 20 by a shaft 20a, and the shaft 20 is held by a shaft holder 22. The shaft holder 22 is fixed on a shaft holder chassis 24.

The aforementioned spindle motor 16 is fixed on a spindle motor chassis 84, and the spindle motor chassis 84 and the shaft holder chassis 24 are joined by a shaft 86. In addition, a cam 88 which oscillates an edge of the shaft holder chassis 24 up and down is provided on the spindle motor chassis 84.

Figure 26:
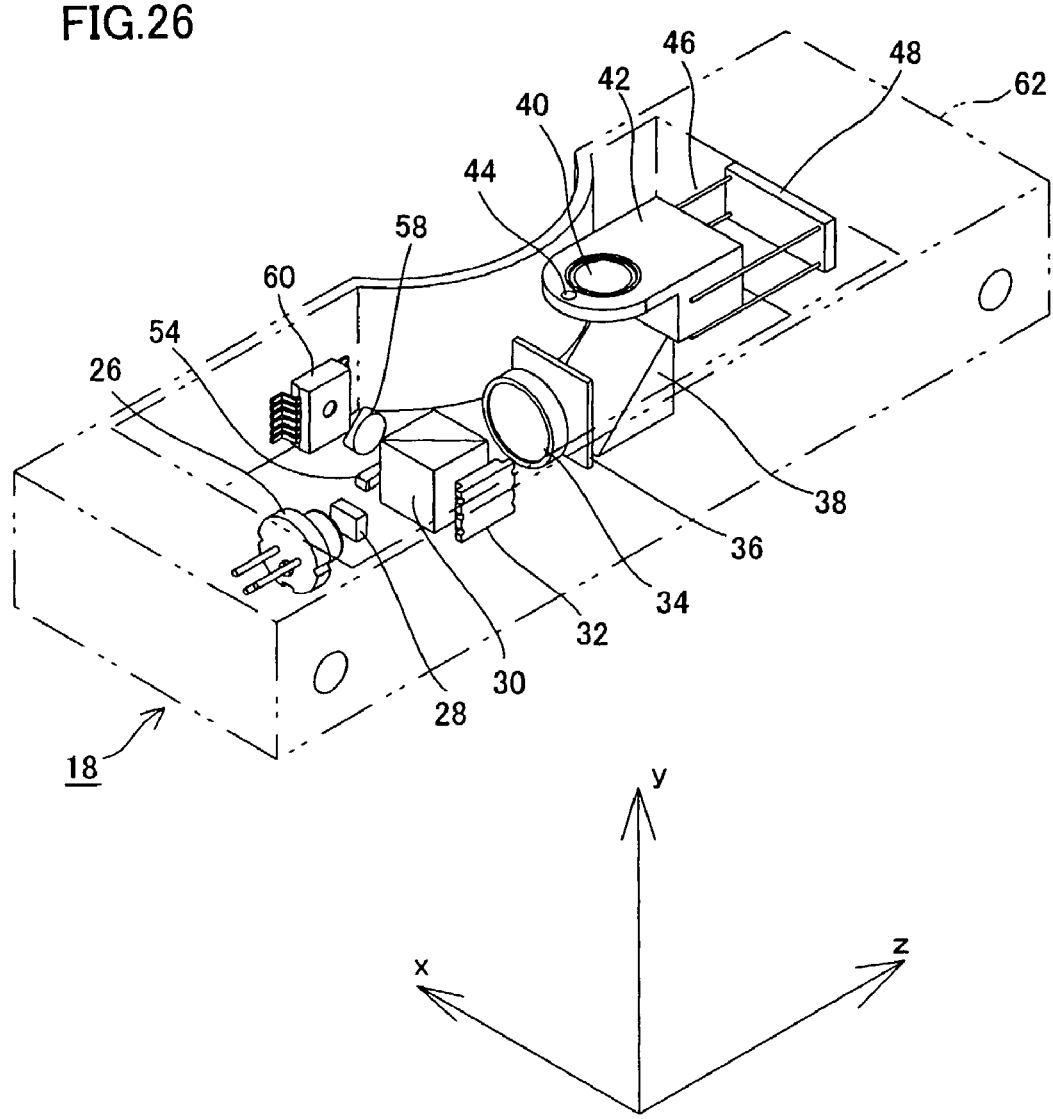
FIG. 26 is an illustrative view showing structure of an optical pick-up of FIG. 25 embodiment.
Figure 27:
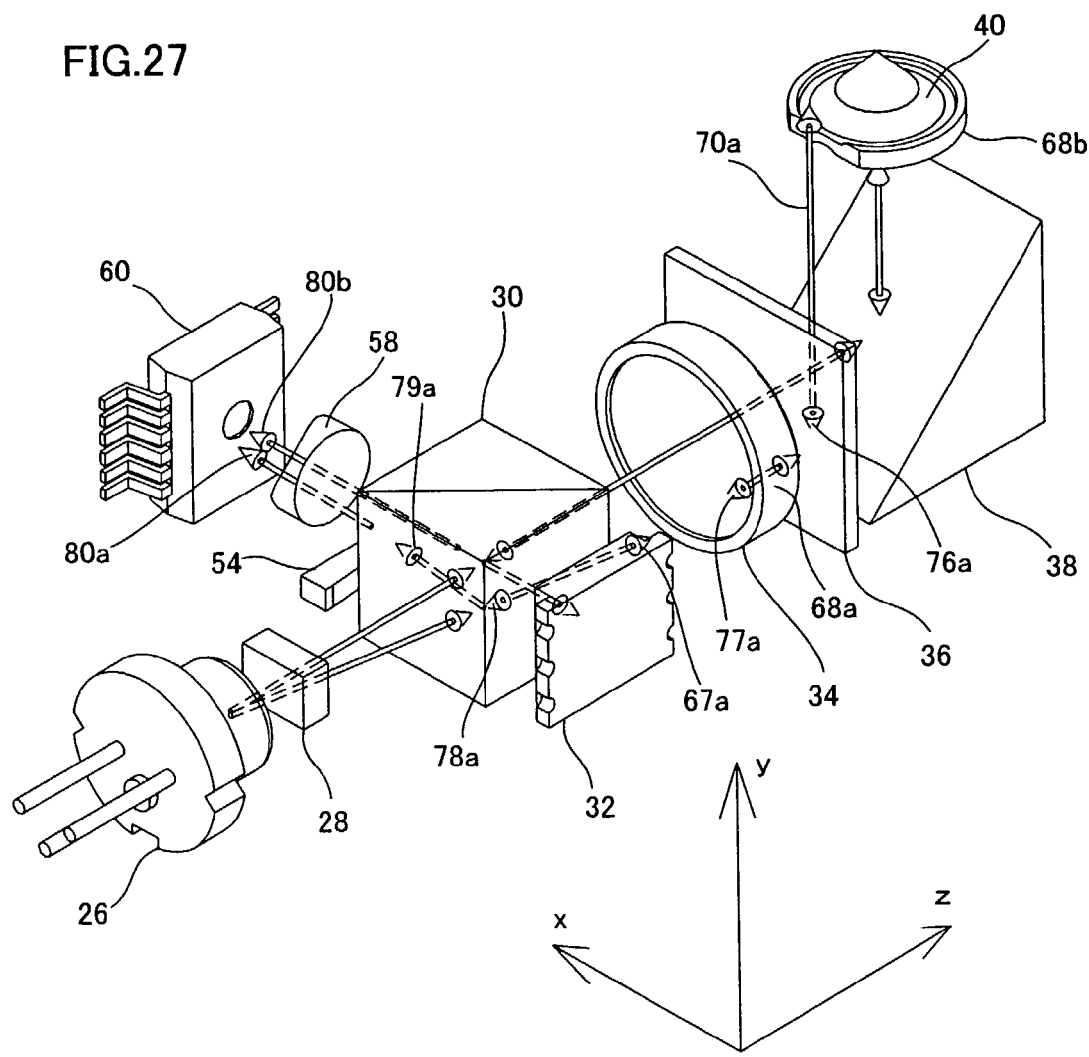
FIG. 27 is an illustrative view showing an optical system of the optical pick-up of FIG. 26.
Figure 28:
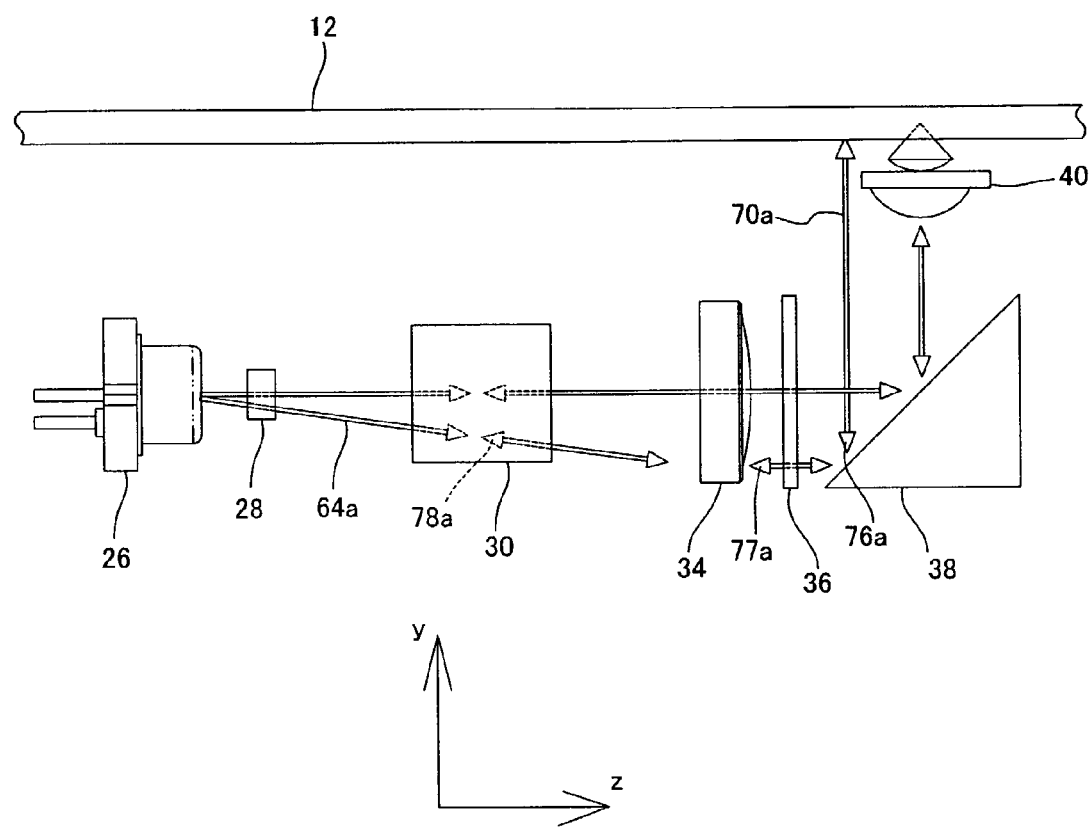
FIG. 28 is a front view showing a yz plane in the optical system in FIG. 27.
Figure 29:
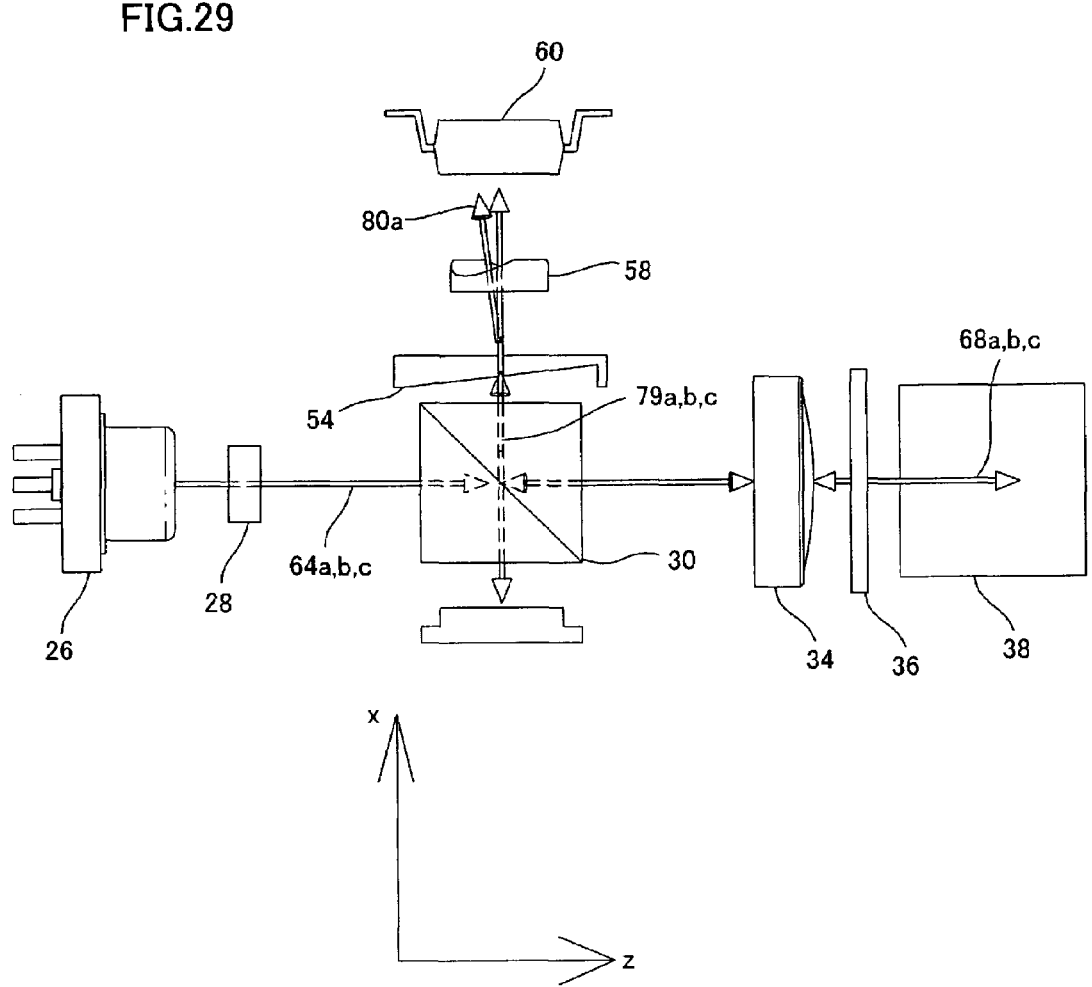
FIG. 29 is an upper surface view showing a zx plane in the optical system in FIG. 27.
Figure 30:
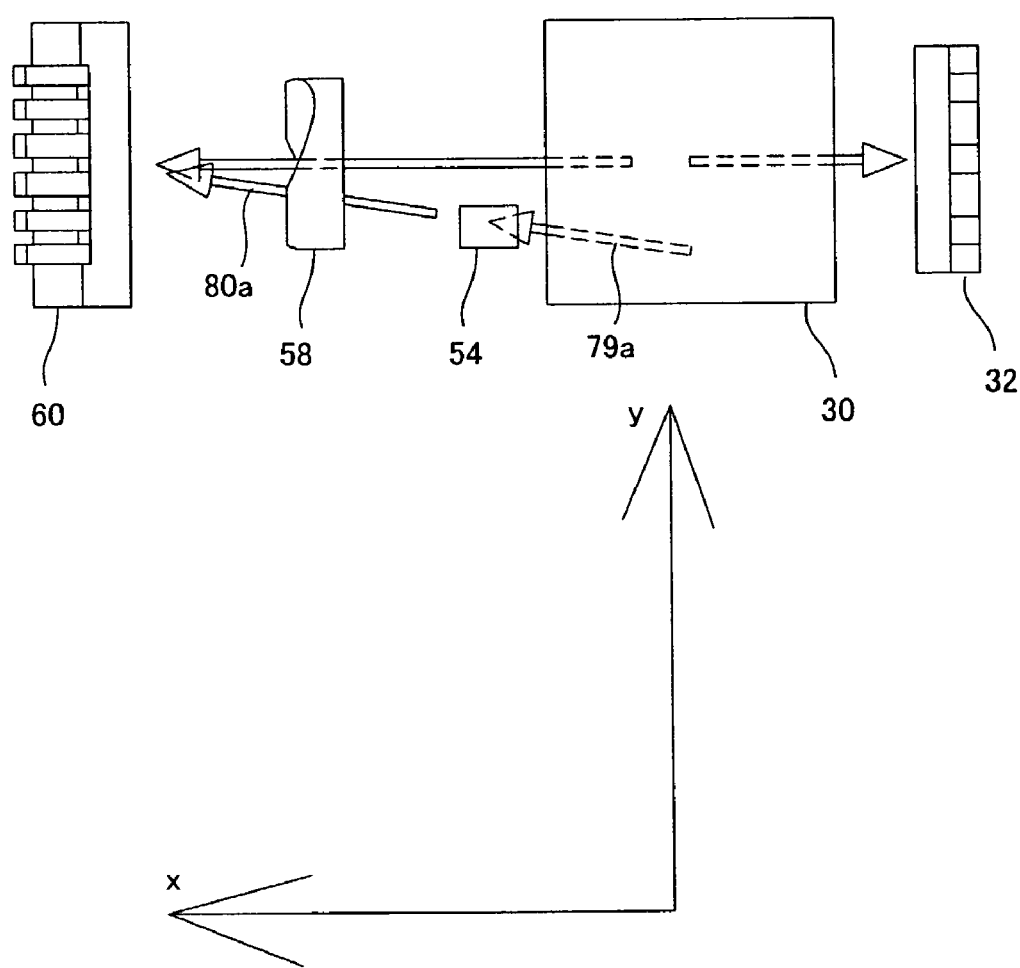
FIG. 30 is a side surface view showing an xy plane in the optical system in FIG. 27.

The optical pick-up 18 shown in FIG. 26 is the same as the optical pick-up 18 shown in FIG. 4 except for following points. Herein, duplicated descriptions are omitted using same or similar reference numerals. That is, in this second embodiment, only one prism 54 is provided between the polarizing beam splitter 30 and the cylindrical lens 58 in order to detect the disk tilt only.

In FIG. 27 to FIG. 30 showing a state of a light ray of the second embodiment, a light for detecting the object lens tilt, that is, a light to which "b" is attached in the preceding FIG. 19–FIG. 22 is omitted. Therefore, in FIG. 27–FIG. 30, duplicated descriptions are omitted using same or similar reference numerals as FIG. 19–FIG. 22.

Figure 31:
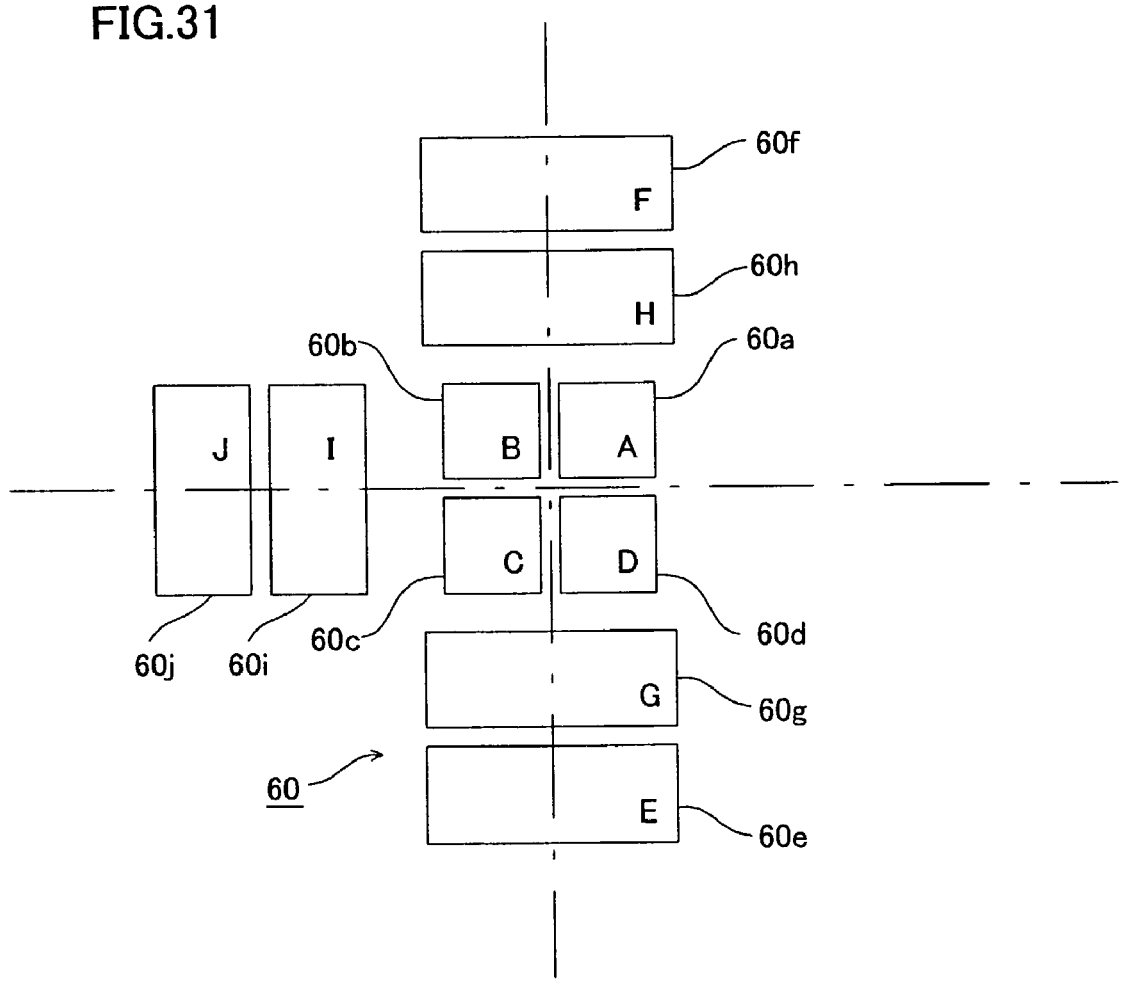
FIG. 31 is an illustrative view showing a divided arrangement of the light-receiving sensor in a case that the tilt detection-use sensor is halved in two in FIG. 25 embodiment.

In addition, the light 79a for detecting the disk tilt is rendered a light 80a by changing its direction toward a radial direction, that is, a z direction in Figures by the disk tilt detection prism 54 as shown in FIG. 27–FIG. 30, and incident on two-divided sensors 60i and 60j for detecting disk tilt shown in FIG. 31.

Since the light 80a is incident to be deviated toward the radial direction from an optical axis, the sensors 60i and the 60j are arranged to be deviated toward the radial direction from the optical axis. This is to avoid a ± primary beam which irradiates to be distant toward a tangential direction when using a differential push-pull method for a tracking. Herein, the two-divided sensors are used in order to deal with the radial tilt only.

A principle of the tilt detection is already described in the first embodiment, thus herein omitted.

A reflected light 76a of a parallel light 70a irradiated onto the disk 12 having such a warp as to generate the radial tilt changes its direction in accordance with a gradient of the disk 12. Therefore, since a direction incident on the collimator lens 34 is also slanted, an image height also changes in accordance therewith.

Since a method to detect the image height is the same as the first embodiment, descriptions are briefly given. Since the detection is only concerned with the radial tilt, descriptions are made using a case that a light-receiving sensor is two-divided sensors. For the sake of simplicity, in a case of absence of the disk tilt, the reflected light 80a is assumed to be incident on a center of the two-divided sensors 60i and 60j, and currents which flow in accordance with an amount of light are defined as Ii and Ij.

If the beam is incident on the center of the two-divided sensors, Ii=Ij is established. If deviated from the center thereof, this results in an unbalance.

If the disk 12 is tilted toward the radial direction, a position on which the reflected light 80a is incident moves toward an aligning direction of the sensors 60i and 60j. As for the image height, that is, a characteristic value which represents the unbalance of the currents, (Il−Ij) is used with respect to the radial direction.

Signs of these characteristic values allow to detect a tilt direction, that is, whether an angle is positive (+) or negative (−). In addition, by using a ratio divided by a total sum a difference of sensor outputs is detected an incident position as a relative value using a size of the two-divided sensors as a reference, these characteristic values can be treated in a same manner in various disks with a different reflectivity as long as the two-divided sensors are the same in size, form, and arrangement.

Similar to the preceding embodiments, these calculations may be realized by a hardware circuit, and may also be calculated by a computer after values of currents are A/D-converted.

Firstly, the radial tilt amount of the disk is detected according to the aforementioned method. Next, the cam 88 shown in FIG. 25 is rotated by a driving source not shown, and oscillates an edge of the shaft holder chassis 84 up and down. As a result, the optical pick-up 18 attached on the chassis 84 changes around the shaft 86, its direction. The comatic aberration is dissolved from a spot on the disk if a relative angle of the disk 12 and the pick-up is detected according to the aforementioned method while changing the gradient of the optical pick-up 18, and the cam 88 is stopped in a state that the spot on the disk is in a good condition.

In a case of absence of the tilt, the light 80a is incident on an approximate center of the entire two-divided sensors, respectively. However, it is not necessarily the exact center. Although the characteristic value does not become zero if deviated from the center, it may be possible to subtract the deviated amount from the characteristic value recognizing that amount as an offset value, or increase a target value in the tilt servo by that amount. In addition, even if being incident on the exact center, the offset value is produced to the characteristic value by the outputs of the two-divided sensors or offsets of outputs of other circuits. The offset value is measurable in a manufacturing process. The pick-up is positioned normally toward the disk toward a disk without a warp and respective characteristic values may be measured in a state that the object lens is tilted so that the comatic aberration is not generated on the disk.

In addition, in a case that both the DVD and the CD are recorded or reproduced by a single optical pick-up and separate light sources are used within the optical pick-up, the tilt detection signal when a horizontal disk with no warp is mounted is not always coincident with the both light sources. This is due to a fact that a direction of the parallel light headed for the disk after transmitting the collimator lens is not coincident when there is an error in position of the both light sources. In such a case, the offset values may be separately measured. Although the CD and the DVD are herein used as an example, a type of the disk is not questioned.

Third Embodiment

In the first embodiment, as for a method detecting an image height proportion to the tilt amount, that is, a position of the light which is incident on the segment sensor, a direction of the tilt to be detected and a perpendicular symmetrical axis are divided in two, and a difference of the sensor outputs is defined as a characteristic value. However, a method which uses a ratio that divides the output difference by a total sum as the characteristic value is herein described. The third embodiment can be also adapted to the second embodiment.

Since an optical disk apparatus 10, its optical system, the optical route, and the tilt detection method are completely the same as the first embodiment, its descriptions are herein omitted.

Next, a method of detecting an image height is described using a case that the light-receiving sensor is a four-divided sensor. For the sake of simplicity, in a case of absence of the disk tilt, the reflected light 80a (FIG. 22 and FIG. 30) is assumed to be incident on a center of four-divided sensors 60i, 60j, 60k and 60l shown in FIG. 8.

Currents which flow in accordance with the amount of light are defined as Ii, Ij, Ik and Ii. If the beam falls on a center of the entire four-divided sensors, Ii, =Ij, =Ik is established. If deviated from the center, these result in an unbalance.

If the disk 12 is tilted toward the radial direction, a position on which the reflected light 80a is incident moves toward an aligning direction of the sensor 60i and the sensor 60j or toward an aligning direction of the sensor 60l and the sensor 60k. If slanted toward the tangential direction, the position on which the reflected light 80a is incident moves toward an aligning direction of the sensor 60i and the sensor 60l or toward an aligning direction of the sensor 60j and the sensor 60k.

As for a characteristic value representing the image height, that is, a current unbalance, $((Ii+Il)-(Ij+Ik))/(Ii+Il+Ij+Ik)$ is used for a radial direction. For a tangential direction, $((Ii+Ij)-(Ii+Ik))/(Ii+Il+Ij+Ik))$ is used.

Likewise, a case that the object lens is tilted is described. For the sake of simplicity, the reflected light 80 (FIG. 22, FIG. 30) is assumed to be incident on a center of the four-divided sensors 60m, 60n, 60o and 60p in a case of absence of the lens tilt. Currents which flow in accordance with the amount of light are defined as Im, In, Io and Ip. If fallen on the center of the four-divided sensors, Im=In=Io=Ip is established. If deviated from the center, these result in an unbalance.

When the object lens 40, that is, lens tilt mirror 50 is tilted toward the radial direction, the position on which the reflected light 80b is incident moves toward an aligning direction of the sensor 60m and the sensor 60n or toward an aligning direction of the sensor 60p and the sensor 60o. If slanted toward the tangential direction, the position on which the reflected light 80b is incident moves toward an aligning direction of the 60m and the sensor 60p or toward an aligning direction of the sensor 60n and the sensor 60o.

As for a characteristic value representing the image height, that is, a current unbalance, ((Im+Ip)−(In+Io))/(Im+Ip+Io+Ip) is used for a radial direction. For a tangential direction, ((In+Im)−(Ip+Io))/(Ii+In+Io+ip) is used.

Signs of these characteristic values allows to detect the tilt direction, that is, a positive (+) or minus (−) of the angle. In addition, since the incident position can be detected as a relative value using a size of the four-divided sensors as a reference by dividing in two by the tilt direction to be detected and the perpendicular symmetric axis and using a ratio which divides a difference of the added sensor output divided by a total sum, these characteristic values can be treated in an equal manner in respective reflected lights of a different reflection rate of the disk and the lens tilt mirror as long as the four-divided sensor is the same in size, form, and arrangement. Obviously, it is possible to correspond to various disks of a different reflection rate due to the same reason.

Similar to the preceding first embodiment and the second embodiment, these calculations may be realized by a hardware circuit, and may also be calculated by a computer after values of currents are A/D-converted.

Although the above is described using the four-divided sensor, in a case of detecting either one of the radial or tangential tilt, the two-divided sensor may be appropriate, and the detection is also appropriately done in this case. Points similar to a case of the four-divided sensor are described using FIG. 23 by taking the detection of the radial tilt as an example.

The reflected light 80a is incident on two-divided sensors 60i and 60j shown in FIG. 23. Currents which flow in accordance with an amount of light are defined as Ii and Ij. If the disk 12 is slanted toward the radial direction, a position upon which the reflected light 80a is incident moves toward an aligning direction with the sensor 60i and the sensor 60j. With respect to the radial direction, (Ii−Ij)/(Ii+Ij) is used as the image height, that is, a characteristic value representing an unbalance of the current.

Likewise, the reflected light 80b is incident on the sensor 60k and the sensor 60l. Currents which flow in accordance with an amount of light are defined as Ik and Il. If the object lens, that is, the lens tilt mirror 50 is slanted toward the radial direction, a position on which the reflected light 80b is incident moves toward an aligning direction with the sensor 60k and the sensor 60l. With respect to the radial direction, ((Ik−Il)/(Ik+Il) is used as the image height, that is, a characteristic value representing an unbalance of the current.

With respect to an operation of the tilt servo, its description is omitted because it is the same as the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk apparatus, comprising:
    a collimator lens which converts a light from a light source into a parallel light;
    an object lens;
    an object lens holder which holds said object lens;
    a light transmitting portion formed in said object lens holder at a first position separated from said object lens in a direction that is tangential to a track of an optical disk, and through which a portion of transmitted parallel light is irradiated onto said optical disk;
    a first condensing lens which receives said transmitted parallel light reflected from said optical disk;
    a first prism which changes a direction of said transmitted parallel light; and
    a disk tilt sensor which receives an incident light from said first prism and has a plurality of first light-receiving sensors.

2. An optical disk apparatus according to claim 1, further comprising:
    a reflection portion which moves in an integrated manner with said object tens holder and reflects said transmitted parallel light, and which is located at a second position opposite to said first position in a track tangential direction of said optical disk so as to output the reflected light;
    a second condensing lens which receives said reflected parallel light;
    a second prism which changes a direction of said reflected parallel light; and
    a lens tilt sensor which receives an incident light from, said second prism and has a plurality of second light-receiving sensors.

3. An optical disk apparatus according to claim 2, wherein said reflection portion includes a reflection plate.

4. An optical disk apparatus according to claim 3, wherein said reflection plate includes a flat flange of said object lens holder.

5. An optical disk apparatus according to any one of claims 2, 3, and 4, wherein said first prism and said second prism are provided at distant positions which are opposite with each other from the optical axis, and change a direction of light to a mutually opposite direction toward the optical axis.

6. An optical disk apparatus according to claim 2, further comprising a means which performs an operation of an output difference of a pair of sensors aligned toward a moving direction of a beam or an output difference of a pair of sensor clusters in order to detect a position of the beam which falls on said first light-receiving sensors or said second light-receiving sensors.

7. An optical disk apparatus according to claim 6, wherein respective sensor output balances of said first light-receiving sensors or said second light-receiving sensors in a case of absence of a disk tilt or an object lens tilt are used as a reference value.

8. An optical disk apparatus according to claim 2, further comprising a means which performs an operation of a ratio which is obtained by dividing an output difference of a pair of sensors aligned toward a moving direction of a beam by an output sum of the pair of sensors, or a ratio which is obtained by dividing an output difference of a pair of sensor clusters by an output sum of the pair of sensor clusters in order to detect a position of the beam which falls on said first light-receiving sensors or said second light-receiving sensors.

9. An optical disk apparatus according to claim 8, wherein respective sensor output balances of said first light-receiving sensors or said second light-receiving sensors in a case of absence of a disk tilt or an object lens tilt are used as a reference value.

10. An optical disk apparatus according to claim 2, further comprising a tilt servo means which tilts said object lens by a predetermined amount using said object lens tilt sensor in accordance with a disk tilt amount detected using said disk tilt sensor.

11. An optical disk apparatus according to claim 10, wherein said predetermined amount is set in advance in accordance with a disk.

* * * * *